(12) United States Patent
Morag et al.

(10) Patent No.: US 8,529,267 B2
(45) Date of Patent: Sep. 10, 2013

(54) INTEGRATED TRAINING SYSTEM FOR ARTICLES OF FOOTWEAR

(75) Inventors: Erez Morag, Lake Oswego, OR (US); Origet Du Cluzeau, Sevres (FR); Jesse P. Stollak, Portland, OR (US); Arjen G. Tamsma, Hilversum (NL)

(73) Assignee: Nike, Inc., Beaverton, OR (US)

( * ) Notice: Subject to any disclaimer, the term of this patent is extended or adjusted under 35 U.S.C. 154(b) by 258 days.

(21) Appl. No.: 12/916,958

(22) Filed: Nov. 1, 2010

(65) Prior Publication Data

US 2012/0107781 A1    May 3, 2012

(51) Int. Cl.
*A63B 69/00*    (2006.01)
(52) U.S. Cl.
USPC ............................................. 434/247
(58) Field of Classification Search
USPC ............................................. 434/247
See application file for complete search history.

(56) References Cited

U.S. PATENT DOCUMENTS

| | | |
|---|---|---|
| D15,185 S | 8/1884 | Brooks |
| 830,324 A | 9/1906 | Hunt |
| 950,333 A | 2/1910 | Koch |
| 1,087,212 A | 2/1914 | Caldwell |
| 1,184,013 A | 5/1916 | Pierce |
| 1,361,078 A | 12/1920 | Lynn |
| 1,469,766 A | 10/1923 | Blair |
| 1,559,114 A | 10/1925 | Maranville |
| D81,917 S | 9/1930 | Burchfield |
| 2,087,945 A | 7/1937 | Butler |
| 2,095,095 A | 10/1937 | Howard |
| 2,185,397 A | 1/1940 | Birchfield |
| 2,187,430 A | 1/1940 | Olmsted et al. |
| 2,350,879 A | 6/1944 | Daniels |
| D171,130 S | 12/1953 | Gruner |
| 2,918,734 A | 12/1959 | Hyde |
| 2,941,527 A | 6/1960 | Scholl |
| 2,969,062 A | 1/1961 | Landau |
| 3,043,026 A | 7/1962 | Semon |
| 3,063,171 A | 11/1962 | Hollander |
| 3,063,555 A | 11/1962 | Hanington |
| 3,091,871 A | 6/1963 | Tronche |
| D201,865 S | 8/1965 | Bingham, Jr. et al. |
| 3,253,591 A | 5/1966 | Scholl |
| 3,325,919 A | 6/1967 | Robinson |
| 3,328,901 A | 7/1967 | Strickland |

(Continued)

FOREIGN PATENT DOCUMENTS

| | | |
|---|---|---|
| CA | 2526727 | 5/2007 |
| DE | 930798 | 7/1955 |

(Continued)

OTHER PUBLICATIONS

Response to Office Action filed Sep. 12, 2012 in U.S. Appl. No. 12/582,252.

(Continued)

*Primary Examiner* — Kurt Fernstrom
*Assistant Examiner* — Dolores Collins
(74) *Attorney, Agent, or Firm* — Plumsea Law Group, LLC

(57) ABSTRACT

An integrated training system for articles of footwear is disclosed. Each article of footwear includes a set of physical characteristics associated with an athletic skill. A customized training program is provided with each article of footwear to provide custom tailored training for improving the particular athletic skill associated with the selected article of footwear.

34 Claims, 16 Drawing Sheets

(56) References Cited

U.S. PATENT DOCUMENTS

| | | | |
|---|---|---|---|
| 3,341,952 | A | 9/1967 | Dassler |
| 3,352,034 | A | 11/1967 | Braun |
| 3,419,974 | A | 1/1969 | Lange |
| D213,416 | S | 3/1969 | Dittmar et al. |
| 3,481,820 | A | 12/1969 | Jonas |
| D219,503 | S | 12/1970 | Vietas |
| 3,548,420 | A | 12/1970 | Spence |
| 3,597,863 | A | 8/1971 | Austin et al. |
| 3,619,916 | A | 11/1971 | Neri |
| 3,631,614 | A | 1/1972 | Rice |
| 3,649,967 | A | 3/1972 | Millman |
| 3,656,245 | A | 4/1972 | Wilson |
| 3,668,793 | A | 6/1972 | Stohr et al. |
| 3,693,270 | A | 9/1972 | Murray |
| 3,703,775 | A | 11/1972 | Gatti |
| 3,775,874 | A | 12/1973 | Bonneville |
| 3,858,337 | A | 1/1975 | Vogel |
| 3,951,407 | A | 4/1976 | Calacurcio |
| 4,065,861 | A | 1/1978 | Pelfrey |
| 4,084,265 | A | 4/1978 | Anfelt |
| 4,096,649 | A | 6/1978 | Saurwein |
| 4,107,858 | A | 8/1978 | Bowerman et al. |
| 4,146,979 | A | 4/1979 | Fabbrie |
| 4,204,346 | A * | 5/1980 | Fugere ............... 36/114 |
| 4,210,245 | A | 7/1980 | Dodge |
| 4,245,406 | A | 1/1981 | Landay et al. |
| 4,315,374 | A | 2/1982 | Sneeringer |
| 4,335,530 | A | 6/1982 | Stubblefield |
| 4,342,159 | A | 8/1982 | Edwards |
| 4,347,674 | A | 9/1982 | George |
| 4,375,728 | A | 3/1983 | Dassler |
| 4,375,729 | A | 3/1983 | Buchanen, III |
| 4,385,456 | A | 5/1983 | Livernois et al. |
| 4,392,312 | A | 7/1983 | Crowley et al. |
| D271,159 | S | 11/1983 | Muller-Feigelstock |
| D272,200 | S | 1/1984 | Autry et al. |
| 4,428,089 | A | 1/1984 | Dawber et al. |
| D272,772 | S | 2/1984 | Kohno |
| 4,452,289 | A | 6/1984 | Smith |
| 4,454,662 | A | 6/1984 | Stubblefield |
| D278,759 | S | 5/1985 | Norton et al. |
| 4,534,122 | A | 8/1985 | MacPhail |
| 4,574,498 | A | 3/1986 | Norton et al. |
| 4,577,625 | A | 3/1986 | Lohati et al. |
| 4,586,274 | A | 5/1986 | Blair |
| D287,662 | S | 1/1987 | Tonkel |
| 4,633,600 | A | 1/1987 | Dassler et al. |
| 4,667,425 | A | 5/1987 | Effler et al. |
| 4,674,200 | A | 6/1987 | Sing |
| 4,689,901 | A | 9/1987 | Ihlenburg |
| 4,698,923 | A | 10/1987 | Arff |
| 4,703,445 | A | 10/1987 | Dassler |
| 4,715,133 | A | 12/1987 | Hartjes et al. |
| 4,726,126 | A | 2/1988 | Bernhard |
| D294,655 | S | 3/1988 | Heyes |
| D295,231 | S | 4/1988 | Heyes |
| 4,771,394 | A | 9/1988 | Cavanagh |
| 4,819,795 | A * | 4/1989 | Swaney ............... 206/278 |
| 4,825,552 | A | 5/1989 | Bendickson et al. |
| 4,833,796 | A | 5/1989 | Flemming |
| 4,858,343 | A | 8/1989 | Flemming |
| 4,873,774 | A | 10/1989 | Lafever |
| 4,893,519 | A | 1/1990 | Corso et al. |
| 4,951,533 | A | 8/1990 | Hillinger |
| 5,025,573 | A | 6/1991 | Giese et al. |
| 5,056,945 | A | 10/1991 | Klodt |
| D323,217 | S | 1/1992 | Holden |
| 5,092,347 | A | 3/1992 | Shaffer et al. |
| 5,174,049 | A | 12/1992 | Flemming |
| 5,201,126 | A | 4/1993 | Tanel |
| 5,203,793 | A | 4/1993 | Lyden |
| 5,216,827 | A | 6/1993 | Cohen |
| 5,221,379 | A | 6/1993 | Nicholas |
| D339,459 | S | 9/1993 | Yoshikawa et al. |
| 5,289,647 | A | 3/1994 | Mercer |
| 5,299,369 | A | 4/1994 | Goldman |
| D347,709 | S | 6/1994 | Pearson |
| 5,335,429 | A | 8/1994 | Hansen |
| 5,339,544 | A | 8/1994 | Caberlotto |
| 5,343,445 | A * | 8/1994 | Cherdak ............... 368/10 |
| 5,351,422 | A | 10/1994 | Fitzgerald |
| 5,367,791 | A | 11/1994 | Gross et al. |
| 5,383,290 | A | 1/1995 | Grim |
| 5,384,973 | A | 1/1995 | Lyden |
| 5,392,534 | A | 2/1995 | Grim |
| 5,406,723 | A | 4/1995 | Okajima |
| 5,410,823 | A | 5/1995 | Lyoob |
| 5,419,014 | A | 5/1995 | Piantedosi |
| 5,427,370 | A | 6/1995 | Hamblin et al. |
| 5,433,437 | A | 7/1995 | Dudley |
| 5,452,269 | A * | 9/1995 | Cherdak ............... 368/10 |
| 5,452,526 | A | 9/1995 | Collins |
| 5,461,801 | A | 10/1995 | Anderton |
| 5,473,827 | A | 12/1995 | Barre et al. |
| 5,491,015 | A | 2/1996 | Reeves et al. |
| D368,156 | S | 3/1996 | Longbottom et al. |
| 5,500,956 | A | 3/1996 | Schulkin et al. |
| D368,360 | S | 4/1996 | Wolfe |
| D369,672 | S | 5/1996 | Tanaka et al. |
| 5,513,451 | A | 5/1996 | Kataoka et al. |
| 5,524,637 | A | 6/1996 | Erickson |
| 5,526,589 | A | 6/1996 | Jordan |
| 5,530,626 | A * | 6/1996 | Norment ............... 361/814 |
| 5,555,650 | A | 9/1996 | Longbottom et al. |
| 5,572,739 | A | 11/1996 | Kolada et al. |
| 5,572,807 | A | 11/1996 | Kelly et al. |
| 5,592,759 | A * | 1/1997 | Cox ............... 36/141 |
| 5,617,650 | A | 4/1997 | Grim |
| 5,617,653 | A | 4/1997 | Walker et al. |
| 5,629,186 | A * | 5/1997 | Yasukawa et al. ............... 435/177 |
| 5,634,283 | A | 6/1997 | Kastner |
| 5,634,284 | A | 6/1997 | MacPhail |
| 5,669,833 | A | 9/1997 | Stone |
| D387,892 | S | 12/1997 | Briant |
| 5,692,322 | A * | 12/1997 | Lombardino ............... 36/100 |
| D389,298 | S | 1/1998 | Briant |
| 5,709,954 | A | 1/1998 | Lyden et al. |
| 5,737,858 | A | 4/1998 | Levy |
| 5,740,618 | A | 4/1998 | Minden |
| D394,943 | S | 6/1998 | Campbell et al. |
| 5,766,704 | A | 6/1998 | Allen et al. |
| 5,775,010 | A | 7/1998 | Kaneko |
| 5,806,209 | A | 9/1998 | Crowley et al. |
| 5,815,951 | A | 10/1998 | Jordan |
| 5,827,459 | A | 10/1998 | Allen et al. |
| 5,832,636 | A | 11/1998 | Lyden et al. |
| 5,878,378 | A * | 3/1999 | Brommer et al. ............... 702/139 |
| 5,882,205 | A | 3/1999 | Peterson |
| 5,887,371 | A | 3/1999 | Curley, Jr. |
| 5,897,446 | A | 4/1999 | Wiseman et al. |
| 5,929,332 | A * | 7/1999 | Brown ............... 73/172 |
| 5,939,157 | A | 8/1999 | Allen et al. |
| 5,946,828 | A | 9/1999 | Jordan et al. |
| 5,947,845 | A | 9/1999 | Canelas |
| 5,955,159 | A | 9/1999 | Allen et al. |
| 5,956,871 | A | 9/1999 | Korsen |
| D415,340 | S | 10/1999 | McMullin |
| 5,979,083 | A | 11/1999 | Robinson et al. |
| 5,983,529 | A | 11/1999 | Serna |
| 5,985,383 | A | 11/1999 | Allen et al. |
| 5,987,783 | A | 11/1999 | Allen et al. |
| 6,016,613 | A | 1/2000 | Campbell et al. |
| D421,833 | S | 3/2000 | Fallon |
| 6,035,559 | A | 3/2000 | Freed et al. |
| 6,079,127 | A | 6/2000 | Nishimura et al. |
| D427,754 | S | 7/2000 | Portaud |
| 6,099,936 | A | 8/2000 | Kashihara |
| 6,101,746 | A | 8/2000 | Evans |
| 6,112,433 | A | 9/2000 | Greiner |
| 6,125,556 | A | 10/2000 | Peckler et al. |
| 6,145,221 | A | 11/2000 | Hockerson |
| 6,161,315 | A | 12/2000 | Dalton |
| D437,108 | S | 2/2001 | Peabody |
| D437,989 | S | 2/2001 | Cass |

| | | |
|---|---|---|
| 6,195,917 B1 | 3/2001 | Dieckhaus |
| 6,199,303 B1 | 3/2001 | Luthi et al. |
| 6,213,298 B1 * | 4/2001 | Nguyen ............... 206/459.1 |
| 6,231,946 B1 | 5/2001 | Brown, Jr. et al. |
| 6,256,907 B1 | 7/2001 | Jordan et al. |
| 6,270,432 B1 * | 8/2001 | Matlock ................. 473/464 |
| 6,312,361 B1 * | 11/2001 | Hayes ...................... 482/51 |
| 6,315,571 B1 * | 11/2001 | Lee ......................... 434/250 |
| 6,357,146 B1 | 3/2002 | Wordsworth et al. |
| 6,389,714 B1 | 5/2002 | Mack |
| 6,405,606 B1 * | 6/2002 | Walczyk et al. .......... 73/862.381 |
| 6,408,542 B1 | 6/2002 | Shepherd |
| D461,297 S | 8/2002 | Lancon |
| 6,442,875 B1 | 9/2002 | Joubert et al. |
| 6,481,122 B2 | 11/2002 | Brahler |
| D468,517 S | 1/2003 | Recchi et al. |
| 6,523,282 B1 | 2/2003 | Johnston |
| 6,543,158 B2 | 4/2003 | Dieckhaus |
| 6,550,160 B2 | 4/2003 | Miller, II |
| D477,905 S | 8/2003 | Adams et al. |
| D478,714 S | 8/2003 | Recchi |
| 6,618,962 B1 | 9/2003 | Covatch |
| 6,647,549 B2 | 11/2003 | McDevitt et al. |
| 6,647,647 B2 | 11/2003 | Auger et al. |
| 6,671,981 B2 | 1/2004 | Brooks |
| 6,675,505 B2 | 1/2004 | Terashima |
| 6,698,110 B1 | 3/2004 | Robbins |
| 6,708,427 B2 | 3/2004 | Sussmann et al. |
| 6,725,574 B2 | 4/2004 | Hokkirigawa et al. |
| 6,739,075 B2 | 5/2004 | Sizemore |
| 6,746,249 B1 | 6/2004 | Claunch |
| 6,754,984 B2 | 6/2004 | Schaudt et al. |
| D495,122 S | 8/2004 | McMullin |
| 6,808,462 B2 * | 10/2004 | Snyder et al. ................. 473/422 |
| 6,834,446 B2 | 12/2004 | McMullin |
| 6,892,479 B2 | 5/2005 | Auger et al. |
| 6,904,707 B2 | 6/2005 | McMullin |
| 6,915,595 B2 | 7/2005 | Kastner |
| 6,915,596 B2 | 7/2005 | Grove et al. |
| 6,935,055 B2 | 8/2005 | Oorei |
| 6,941,684 B2 | 9/2005 | Auger et al. |
| 6,954,998 B1 | 10/2005 | Lussier |
| 6,968,637 B1 | 11/2005 | Johnson |
| 6,973,745 B2 | 12/2005 | Mills et al. |
| 6,973,746 B2 | 12/2005 | Auger et al. |
| 7,007,410 B2 | 3/2006 | Auger et al. |
| 7,028,419 B2 | 4/2006 | Brooks |
| D525,416 S | 7/2006 | Auger et al. |
| 7,143,530 B2 | 12/2006 | Hudson et al. |
| 7,155,846 B2 | 1/2007 | Alfaro et al. |
| 7,172,521 B1 | 2/2007 | Novis |
| 7,181,868 B2 | 2/2007 | Auger et al. |
| 7,188,439 B2 * | 3/2007 | DiBenedetto et al. .......... 36/132 |
| 7,194,826 B2 | 3/2007 | Ungari |
| 7,234,250 B2 | 6/2007 | Fogarty et al. |
| 7,241,234 B2 | 7/2007 | Eite |
| 7,254,909 B2 | 8/2007 | Ungari |
| 7,269,916 B2 | 9/2007 | Biancucci et al. |
| 7,287,343 B2 | 10/2007 | Healy |
| 7,292,867 B2 | 11/2007 | Werner et al. |
| 7,329,448 B2 | 2/2008 | Cunningham |
| 7,355,519 B2 | 4/2008 | Grold et al. |
| 7,370,439 B1 | 5/2008 | Myers |
| D571,092 S | 6/2008 | Norton |
| D571,542 S | 6/2008 | Wilken |
| 7,386,948 B2 | 6/2008 | Sink |
| D573,779 S | 7/2008 | Stauffer |
| 7,401,418 B2 | 7/2008 | Wyszynski et al. |
| D575,041 S | 8/2008 | Wilken |
| 7,406,781 B2 | 8/2008 | Scholz |
| 7,409,783 B2 | 8/2008 | Chang |
| D578,280 S | 10/2008 | Wilken |
| 7,430,819 B2 | 10/2008 | Auger et al. |
| 7,441,350 B2 | 10/2008 | Auger et al. |
| 7,490,418 B2 | 2/2009 | Obeydani |
| 7,497,035 B2 | 3/2009 | Kos et al. |
| 7,536,810 B2 | 5/2009 | Jau et al. |
| 7,559,160 B2 | 7/2009 | Kelly |
| 7,575,433 B2 | 8/2009 | Shibata et al. |
| 7,579,946 B2 * | 8/2009 | Case, Jr. ..................... 340/539.1 |
| 7,581,643 B2 * | 9/2009 | Wilskey et al. ............... 206/736 |
| 7,584,554 B2 | 9/2009 | Fogarty et al. |
| 7,596,891 B2 * | 10/2009 | Carnes et al. .................... 36/132 |
| 7,650,707 B2 | 1/2010 | Campbell et al. |
| D609,436 S * | 2/2010 | Flint ............................ D2/909 |
| 7,654,013 B2 | 2/2010 | Savoie et al. |
| 7,665,229 B2 | 2/2010 | Kilgore et al. |
| 7,673,400 B2 | 3/2010 | Brown et al. |
| 7,685,741 B2 | 3/2010 | Friedman |
| 7,685,745 B2 | 3/2010 | Kuhtz et al. |
| 7,707,748 B2 | 5/2010 | Campbell |
| 7,727,608 B2 | 6/2010 | Cunningham |
| 7,762,009 B2 | 7/2010 | Gerber |
| 7,784,196 B1 | 8/2010 | Christensen et al. |
| 7,866,064 B2 | 1/2011 | Gerber |
| D632,466 S | 2/2011 | Kasprzak |
| 7,941,943 B2 | 5/2011 | Baker et al. |
| 7,942,784 B1 * | 5/2011 | Hyde et al. ........................ 482/9 |
| 7,984,569 B2 * | 7/2011 | Chaney et al. .................... 36/15 |
| 7,997,007 B2 | 8/2011 | Sanabria-Hernandez ......... 36/1 |
| 8,043,173 B2 * | 10/2011 | Menalagha et al. ........... 473/464 |
| 8,079,160 B2 * | 12/2011 | Baucom et al. .................. 36/61 |
| 8,122,617 B1 | 2/2012 | Dixon et al. |
| 8,196,321 B2 | 6/2012 | Baker et al. |
| 8,196,322 B2 | 6/2012 | Atsumi et al. |
| 8,246,494 B2 | 8/2012 | Stephenson |
| 8,251,207 B2 * | 8/2012 | Baker et al. ..................... 206/223 |
| 8,256,145 B2 | 9/2012 | Baucom et al. |
| 8,257,228 B2 * | 9/2012 | Quatrochi et al. ................ 482/9 |
| 8,262,515 B2 | 9/2012 | Morris |
| 8,286,619 B2 | 10/2012 | Mihaljevic |
| 2001/0022039 A1 | 9/2001 | Krajcir |
| 2002/0017036 A1 | 2/2002 | Berger et al. |
| 2002/0029496 A1 | 3/2002 | Morle |
| 2002/0078603 A1 | 6/2002 | Schmitt, Jr. |
| 2002/0100190 A1 | 8/2002 | Pellerin |
| 2002/0178619 A1 | 12/2002 | Schaudt et al. |
| 2003/0033731 A1 | 2/2003 | Sizemore |
| 2003/0188458 A1 | 10/2003 | Kelly |
| 2004/0000075 A1 | 1/2004 | Auger et al. |
| 2004/0035024 A1 | 2/2004 | Kao |
| 2004/0046692 A1 * | 3/2004 | Robson et al. ............ 342/357.06 |
| 2004/0088888 A1 | 5/2004 | Johnston |
| 2004/0187356 A1 | 9/2004 | Patton |
| 2004/0250451 A1 | 12/2004 | McMullin |
| 2005/0016023 A1 | 1/2005 | Burris |
| 2005/0016029 A1 | 1/2005 | Auger et al. |
| 2005/0072026 A1 | 4/2005 | Sink |
| 2005/0097783 A1 | 5/2005 | Mills et al. |
| 2005/0108898 A1 | 5/2005 | Jeppesen et al. |
| 2005/0120593 A1 | 6/2005 | Mason |
| 2005/0144812 A1 | 7/2005 | Wheeler |
| 2005/0217149 A1 | 10/2005 | Ho |
| 2005/0221919 A1 | 10/2005 | Eite |
| 2005/0257405 A1 | 11/2005 | Kilgore |
| 2005/0268490 A1 | 12/2005 | Foxen |
| 2006/0016101 A1 | 1/2006 | Ungari |
| 2006/0021254 A1 | 2/2006 | Jones |
| 2006/0021255 A1 | 2/2006 | Auger et al. |
| 2006/0026528 A1 * | 2/2006 | Paulsen et al. ................. 715/776 |
| 2006/0042124 A1 | 3/2006 | Mills et al. |
| 2006/0130372 A1 | 6/2006 | Auger et al. |
| 2006/0218821 A1 | 10/2006 | Hatzilias |
| 2006/0242863 A1 | 11/2006 | Patmore |
| 2007/0039209 A1 | 2/2007 | White et al. |
| 2007/0199211 A1 | 8/2007 | Campbell |
| 2007/0199213 A1 | 8/2007 | Campbell et al. |
| 2007/0227047 A1 * | 10/2007 | Zaza ............................... 36/133 |
| 2007/0231778 A1 | 10/2007 | Kim et al. |
| 2007/0261271 A1 | 11/2007 | Krouse |
| 2007/0266597 A1 | 11/2007 | Jones |
| 2008/0009275 A1 | 1/2008 | Werner et al. |
| 2008/0010863 A1 | 1/2008 | Auger et al. |
| 2008/0059064 A1 | 3/2008 | Werner et al. |
| 2008/0066348 A1 | 3/2008 | O'Brien et al. |
| 2008/0098624 A1 | 5/2008 | Goldman |
| 2008/0127520 A1 | 6/2008 | Luedecke et al. |
| 2008/0196276 A1 | 8/2008 | McMullin |

| | | | | | |
|---|---|---|---|---|---|
| 2008/0214360 A1 | 9/2008 | Stirling et al. | EP | 2057913 | 5/2009 |
| 2008/0216352 A1 | 9/2008 | Baucom et al. | EP | 2499928 | 9/2012 |
| 2008/0218310 A1 | 9/2008 | Alten et al. | FR | 1554061 | 1/1969 |
| 2008/0258921 A1 | 10/2008 | Woo et al. | FR | 2567004 | 1/1986 |
| 2008/0293023 A1 | 11/2008 | Diehl et al. | FR | 2818876 | 7/2002 |
| 2008/0319661 A1 | 12/2008 | Werner et al. | GB | 1329314 | 9/1973 |
| 2009/0019732 A1 | 1/2009 | Sussmann | GB | 2020161 | 11/1979 |
| 2009/0042673 A1 | 2/2009 | Radice | GB | 2113971 | 8/1983 |
| 2009/0047645 A1* | 2/2009 | Dibenedetto et al. ......... 434/258 | GB | 2256784 | 12/1992 |
| 2009/0048044 A1 | 2/2009 | Oleson et al. | GB | 2354422 | 3/2001 |
| 2009/0048070 A1 | 2/2009 | Vincent et al. | GB | 2377616 | 1/2003 |
| 2009/0056169 A1 | 3/2009 | Robinson, Jr. et al. | GB | 2413052 | 10/2005 |
| 2009/0056172 A1 | 3/2009 | Cho | GB | 2425706 | 11/2006 |
| 2009/0077832 A1 | 3/2009 | Flint | GB | 2439041 | 12/2007 |
| 2009/0100711 A1 | 4/2009 | Engel | JP | 9209206 | 8/1997 |
| 2009/0100716 A1 | 4/2009 | Gerber | JP | 9253266 | 9/1997 |
| 2009/0100718 A1 | 4/2009 | Gerber | JP | 10000105 | 1/1998 |
| 2009/0113758 A1 | 5/2009 | Nishiwaki et al. | JP | 10066605 | 3/1998 |
| 2009/0113766 A1 | 5/2009 | Hooper | JP | 63256704 | 10/1998 |
| 2009/0124434 A1 | 5/2009 | Abboud | JP | 11276204 | 10/1999 |
| 2009/0126230 A1 | 5/2009 | McDonald et al. | JP | 2002272506 | 9/2002 |
| 2009/0223088 A1 | 9/2009 | Krikorian et al. | JP | 2002306207 | 10/2002 |
| 2009/0241370 A1 | 10/2009 | Kimura | JP | 2004024811 | 1/2004 |
| 2009/0241377 A1 | 10/2009 | Kita et al. | JP | 2005185303 | 7/2005 |
| 2009/0272008 A1 | 11/2009 | Nomi et al. | JP | 2005304653 | 11/2005 |
| 2009/0284368 A1* | 11/2009 | Case, Jr. ..................... 340/539.1 | TW | 540323 | 7/2003 |
| 2009/0293315 A1 | 12/2009 | Auger et al. | TW | 540323 U | 7/2003 |
| 2009/0307933 A1 | 12/2009 | Leach | TW | M267886 | 6/2005 |
| 2010/0050471 A1 | 3/2010 | Kim | TW | M267886 U | 6/2005 |
| 2010/0077635 A1 | 4/2010 | Baucom et al. | WO | 0053047 | 9/2000 |
| 2010/0083541 A1 | 4/2010 | Baucom et al. | WO | 03045182 | 6/2003 |
| 2010/0126044 A1 | 5/2010 | Davis | WO | 03071893 | 9/2003 |
| 2010/0199523 A1 | 8/2010 | Mayden et al. | WO | WO 03071893 | 9/2003 |
| 2010/0212190 A1 | 8/2010 | Schmid | WO | 2006103619 | 10/2006 |
| 2010/0229427 A1 | 9/2010 | Campbell et al. | WO | 2008069751 | 6/2008 |
| 2010/0251578 A1 | 10/2010 | Auger et al. | WO | 2008128712 | 10/2008 |
| 2010/0275463 A1* | 11/2010 | Gallagher ....................... 36/133 | WO | 2009110822 | 9/2009 |
| 2010/0299961 A1 | 12/2010 | Baker et al. | WO | WO 2009110822 | 9/2009 |
| 2010/0299967 A1 | 12/2010 | Atsumi et al. | WO | 2010036988 | 4/2010 |
| 2010/0304346 A1 | 12/2010 | Morag | WO | WO 2010036988 | 4/2010 |
| 2010/0313447 A1 | 12/2010 | Becker et al. | WO | 2010057207 | 5/2010 |
| 2010/0331122 A1* | 12/2010 | Morag ........................ 473/422 | WO | 2012150971 | 11/2012 |
| 2011/0045926 A1* | 2/2011 | Morag et al. ................. 473/464 | | | |
| 2011/0047830 A1 | 3/2011 | Francello et al. | | | |
| 2011/0078922 A1 | 4/2011 | Cavaliere et al. | | | |
| 2011/0078927 A1 | 4/2011 | Baker | | | |
| 2011/0088287 A1 | 4/2011 | Auger et al. | | | |
| 2011/0126426 A1 | 6/2011 | Amark | | | |
| 2011/0167676 A1 | 7/2011 | Benz et al. | | | |
| 2011/0197475 A1 | 8/2011 | Weidl et al. | | | |
| 2011/0197478 A1 | 8/2011 | Baker | | | |
| 2011/0203136 A1 | 8/2011 | Auger | | | |
| 2012/0052987 A1 | 3/2012 | Goodman | | | |
| 2012/0107781 A1 | 5/2012 | Morag et al. | | | |
| 2012/0180343 A1 | 7/2012 | Auger et al. | | | |
| 2012/0277891 A1* | 11/2012 | Aragones et al. ............... 700/91 | | | |

FOREIGN PATENT DOCUMENTS

| | | |
|---|---|---|
| DE | 1809860 | 4/1960 |
| DE | 2721410 | 11/1978 |
| DE | 3046811 | 7/1982 |
| DE | 3135347 | 3/1983 |
| DE | 3245182 | 5/1983 |
| DE | 3600525 | 10/1987 |
| DE | 3644812 | 6/1988 |
| DE | 3706069 | 9/1988 |
| DE | 4417563 | 11/1995 |
| DE | 19817579 | 10/1999 |
| EP | 0115663 | 8/1984 |
| EP | 115663 | 8/1984 |
| EP | 123550 | 10/1984 |
| EP | 0123550 | 10/1984 |
| EP | 0223700 | 5/1987 |
| EP | 340053 | 11/1989 |
| EP | 0723745 | 7/1996 |
| EP | 1025771 | 8/2000 |
| EP | 1430801 | 6/2004 |
| EP | 1714571 | 10/2006 |
| EP | 1839511 | 10/2007 |

OTHER PUBLICATIONS

Notice of Allowance mailed Sep. 20, 2012 in U.S. Appl. No. 12/582,252.
Pending U.S. Appl. No. 13/561,608, filed Jul. 30, 2012.
Pending U.S. Appl. No. 13/561,557, filed Jul. 30, 2012.
Pending U.S. Appl. No. 13/234,182, filed Sep. 16, 2011.
Pending U.S. Appl. No. 13/234,183, filed Sep. 16, 2011.
Pending U.S. Appl. No. 13/234,185, filed Sep. 16, 2011.
Pending U.S. Appl. No. 13/009,549, filed Jan. 19, 2011.
Pending U.S. Appl. No. 13/234,244, filed Sep. 16, 2011.
Pending U.S. Appl. No. 12/582,252, filed Oct. 20, 2009.
Pending U.S. Appl. No. 13/234,233, filed Sep. 16, 2011.
International Search Report for PCT/US2010/050637 dated Jan. 14, 2011.
Partial Search Report for PCT/US2009/058522 dated Mar. 4, 2010.
U.S. Appl. No. 12/239,190, filed Sep. 26, 2008.
U.S. Appl. No. 12/566,792, filed Sep. 25, 2009.
U.S. Appl. No. 12/711,107, filed Feb. 23, 2010.
U.S. Appl. No. 12/708,411, filed Feb. 18, 2010.
U.S. Appl. No. 12/572,154, filed Oct. 1, 2009.
International Search Report for PCT/US2009/058522 dated Feb. 17, 2010.
International Search Report for PCT/US2010/029640 dated May 17, 2010.
International Search Report and Written Opinion for PCT/US2011/045356 dated Dec. 16, 2011.
International Search Report and Written Opinion for PCT/US2011/022841 dated Apr. 15, 2011.
International Search Report and Written Opinion for PCT/US2011/022848 dated Jun. 20, 2011.
Aug. 12, 2010, Icebug Web Page (date based on information from Internet Archive).

Dec. 23, 2008, Icebug Web Page (date based on information from Internet Archive).
Voluntary Amendments filed Sep. 20, 2012 in Chinese Patent Application No. 201080033231.2 with English-language translation.
Voluntary Amendments filed Nov. 22, 2012 in Chinese Patent Application No. 201080033236.5 with English-language translation.
Pending U.S. Appl. No. 13/582,252, filed Oct. 20, 2009.
Pending U.S. Appl. No. 13/234,180, filed Sep. 16, 2011.
International Search Report and Written Opinion mailed Mar. 15, 2011 in International Application No. PCT/US2010/034821.
International Preliminary Report on Patentability (including Written Opinion of the ISA) mailed Dec. 8, 2011 in International Application No. PCT/US2010/034821.
Invitation to Pay Additional Fees and International Search Report, mailed Nov. 19, 2010 in International Application No. PCT/US2010/036495.
International Search Report and Written Opinion of The International Searching Authority mailed Jan. 18, 2011 in International Application No. PCT/US2010/036495.
International Preliminary Report on Patentability (including Written Opinion of the ISA) mailed Dec. 8, 2011 in International Application No. PCT/US2010/036495.
International Search Report and Written Opinion mailed Jun. 7, 2010 in PCT Application No. PCT/US2009/058522.
International Search Report and Written Opinion mailed May 24, 2010 in PCT Application No. PCT/US2010/029640.
U.S. Appl. No. 12/824,753, filed Jun. 28, 2010.
U.S. Appl. No. 12/824,768, filed Jun. 28, 2010.
Jumpusa.com, Jumpsoles v5.0 Vertical Jump & Speed Training System, http://www.jumpusa.com/mm5/merchant.mvc?Screen=PROD&Store_Code=J&Product_C, retrieved May 27, 2010, 1 page.
International Search Report and Written Opinion mailed Mar. 8, 2013 in International Application No. PCT/US2012/052965.
International Search Report and Written Opinion mailed Mar. 8, 2013 in International Application No. PCT/US2012/052968.
International Search Report and Written Opinion mailed Mar. 8, 2013 in International Application No. PCT/US2012/052970.
International Search Report and Written Opinion mailed Jun. 13, 2012 in International Application No. PCT/US2012/021663.
Office Action mailed Jun. 13, 2012 in U.S. Appl. No. 12/582,252.
Office Action mailed Aug. 22, 2012 in U.S. Appl. No. 12/636,427.
Response to Office Action filed Nov. 21, 2012 in U.S. Appl. No. 12/636,427.
Final Office Action mailed Feb. 20, 2013 in U.S. Appl. No. 12/636,427.
Office Action mailed Jan. 22, 2013 in U.S. Appl. No. 12/824,753.
Office Action mailed Jan. 22, 2013 in U.S. Appl. No. 12/824,768.
Office Action mailed Sep. 26, 2012 in U.S. Appl. No. 12/752,318.
Response to Office Action filed Dec. 27, 2012 in U.S. Appl. No. 12/752,318.
Notice of Allowance mailed Feb. 7, 2013 in U.S. Appl. No. 12/752,318.
Voluntary Amendment filed Sep. 20, 2012 in Chinese Application No. 201080033231.2 and English translation thereof.
Voluntary Amendment filed Nov. 22, 2012 in Chinese Application No. 201080033236.5 and English translation thereof.
Invitation to Pay Additional Fees and, Where Applicable, Protest Fee mailed Jan. 7, 2013 in International Application No. PCT/US2012/052968.
Invitation to Pay Additional Fees and, Where Applicable, Protest Fee mailed Jan. 8, 2013 in International Application No. PCT/US2012/052970.
Invitation to Pay Additional Fees and, Where Applicable, Protest Fee mailed Jan. 7, 2013 in International Application No. PCT/US2012/052965.
International Search Report and Written Opinion mailed Jan. 22, 2013 in International Application No. PCT/US2012/052972.
Invitation to Pay Additional Fees and, Where Applicable, Protest Fee mailed Feb. 8, 2013 in International Application No. PCT/US2012/052963.
Response to Office Action filed Apr. 22, 2013 in U.S. Appl. No. 12/824,753.
Response to Office Action filed Apr. 22, 2013 in U.S. Appl. No. 12/824,768.
Response to Final Office Action filed on May 10, 2013 in U.S. Appl. No. 12/636,427.

\* cited by examiner

INTEGRATED TRAINING SYSTEM FOR ARTICLES OF FOOTWEAR

BACKGROUND

The present invention relates generally to an integrated training system for articles of footwear, and to article of footwear with associated training systems.

Training systems for articles of footwear have been previously proposed. Zaza (U.S. patent application publication number 2007/0227047) teaches instructional soccer shoes, training aids attachable to soccer shoes, and related methods. Zaza teaches a system where targets are placed on regions of a soccer ball corresponding to areas where different types of kicks are made. The targets can include directional indicators that indicate the proper direction of follow-through after contacting the soccer ball. Zaza also teaches training materials. The training materials could be print media, video-based or graphic-based computer training.

SUMMARY

In one aspect, an embodiment of the invention provides an article of footwear with a training system, comprising: a first article of footwear having a first physical characteristic, the first physical characteristic being associated with a first athletic skill; a second article of footwear having a second physical characteristic, the second physical characteristic being associated with a second athletic skill, the second physical characteristic being different than the first physical characteristic; a first customized training program configured to train a user to improve the first athletic skill; a second customized training program configured to train a user to improve the second athletic skill; and where the first athletic skill is different than the second athletic skill.

In another aspect, an embodiment of the invention provides an integrated training system, comprising: an article of footwear including a physical characteristic associated with an athletic skill; a customized training program; and where the customized training program is configured to train a user to improve the athletic skill.

In another aspect, an embodiment of the invention provides an article of footwear with a training system, comprising: a set of articles of footwear associated with an athletic skill; a first subset of footwear and a second subset of footwear that is different from the first subset of footwear; a set of customized training materials from a customized training program, the customized training program being configured to train a user to improve the athletic skill; the first subset of footwear including the set of customized training materials and the second subset of footwear excluding the set of customized training materials.

Other systems, methods, features and advantages of the invention will be, or will become, apparent to one of ordinary skill in the art upon examination of the following figures, and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
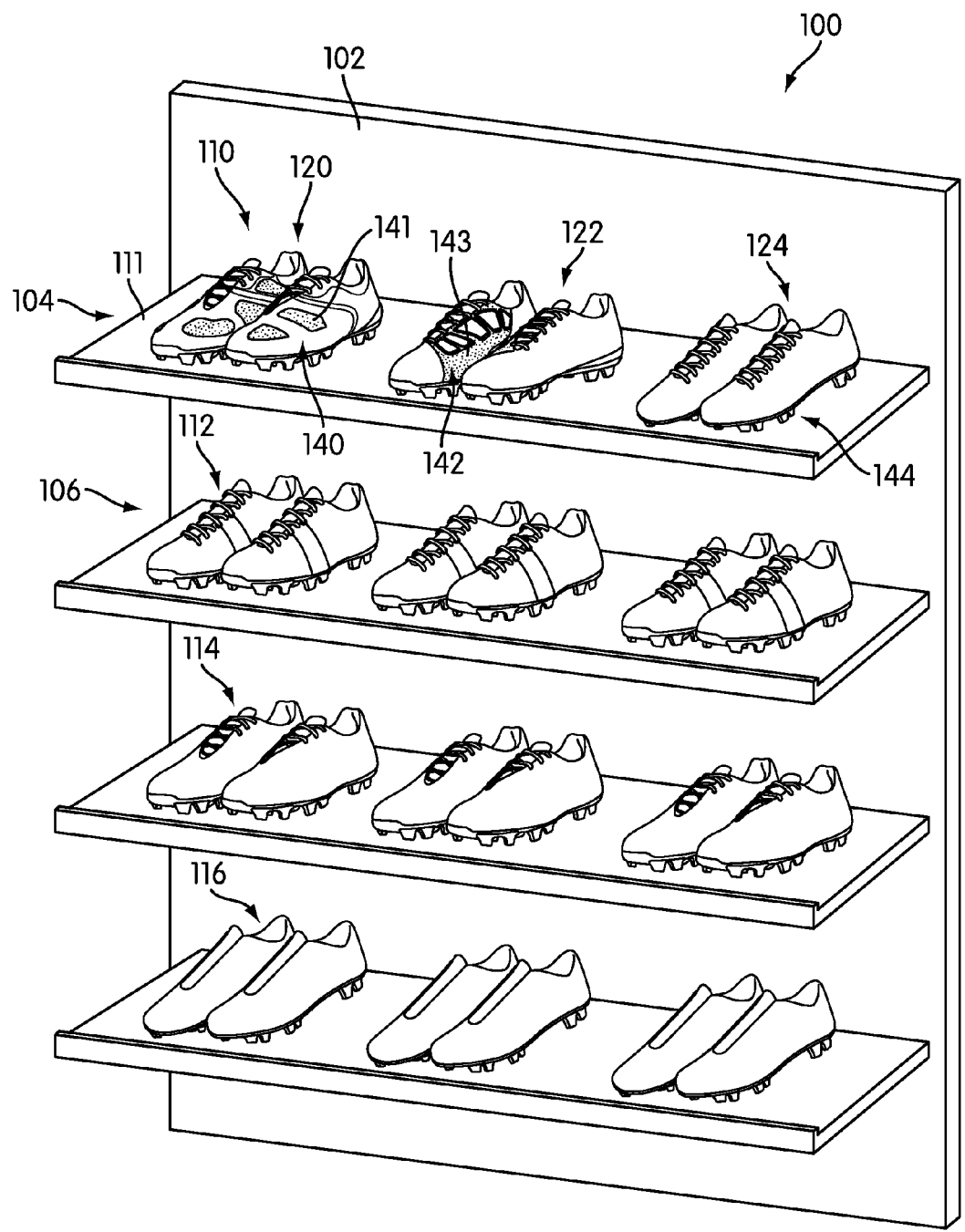
FIG. 1 is a schematic view of an embodiment of a retail environment for selling articles of footwear.

FIG. 1 illustrates an embodiment of retail setting 100 where articles of footwear may be sold. Retail setting 100 could be any type of retail location where footwear is sold including a footwear store, a department store, a kiosk as well as any other type of retail location. Although the current embodiment illustrates a physical retail setting for selling articles of footwear, in other embodiments, articles of footwear could be sold online.

Referring to FIG. 1, retail setting 100 may be configured with footwear display wall 102, hereby referred to simply as wall 102. In this embodiment, wall 102 further includes shelves 104 for displaying different articles of footwear. Plurality of articles of footwear 106, hereby referred to simply as footwear 106, may be disposed on shelves 104. In one embodiment, plurality of articles of footwear 106 may be various kinds of soccer shoes. In other embodiments, plurality of articles of footwear 106 may be associated with any other kinds of shoes.

Footwear 106 may be organized into different groups of footwear, with each group being displayed on a separate shelf. For example, footwear 106 can comprise first group of footwear 110, second group of footwear 112, third group of footwear 114, and fourth group of footwear 116. Moreover, in some cases, each group of footwear can include three pairs of footwear. In some cases, each group can be associated with common characteristics. It will be understood that in different embodiments, footwear 106 could be sorted on shelves 104 in any manner. Also, while twelve pairs of footwear are shown in the current embodiment, in other embodiments any other number of pairs of footwear could be included.

First group of footwear 110 is disposed on upper shelf 111 and includes three pairs of footwear. In particular, first group of footwear 110 includes first pair of footwear 120, second pair of footwear 122, and third pair of footwear 124. Each pair of footwear may comprise a left shoe and right shoe that are substantially similar in most respects.

In the current embodiment, each pair of footwear in first group of footwear 110 may take the form of a sports shoe. However, it should be noted that in other embodiments the principles discussed in the detailed description and claims could be applied to any other kinds of footwear including, but not limited to: hiking boots, soccer shoes, football shoes, sneakers, rugby shoes, basketball shoes, baseball shoes as well as other kinds of shoes. Footwear in first group of footwear 110 may also take the form of any non-athletic shoe, including, but not limited to: dress shoes, loafers, sandals, and boots. An individual skilled in the relevant art will appreciate, therefore, that the concepts disclosed herein apply to a wide variety of footwear styles, in addition to the specific style discussed in the following material and depicted in the accompanying figures.

In some embodiments, first pair of footwear 120, second pair of footwear 122, and third pair of footwear 124 may be substantially similar types of footwear. In other embodiments, first pair of footwear 120, second pair of footwear 122, and third pair of footwear 124 may be substantially different types of footwear that include different physical characteristics. The term "physical characteristic" as used throughout this detailed description and in the claims refers to any features of an article of footwear including various kinds of materials, structural features, design features as well as other characteristics. Examples of different kinds of physical characteristics include upper materials, sole materials, padding, reinforcing plates, structural features on an upper or sole, traction elements, as well as any kinds of physical characteristics.

In some embodiments, physical characteristics can be provided on an article of footwear in order to assist a user in accomplishing various kinds of athletic skills. The term "athletic skill" as used throughout this detailed description and in the claims refers to any skill or ability that may be applied to a particular sport or athletic activity. For example, in the sport of soccer, athletic skills can include, but are not limited to: forward speed, rearward speed, lateral speed, balance, dribbling, juggling, controlling a ball, passing a ball, shooting a ball as well as other athletic skills. As another example, in the sport of football, athletic skills can include, but are not limited to: passing, catching, forward speed, lateral speed, spinning, tackling as well as other athletic skills. In some cases, articles of footwear can be provided with particular physical characteristics to enhance one or more athletic skills. For example, applying traction elements to the bottom of an article of footwear can help enhance balance and speed by providing improved traction with a ground surface. As another example, using materials with high coefficients of friction on an upper can help improve ball control skills by improving the grip of the article of footwear with the ball.

In some embodiments, each different pair of footwear within first group of footwear 110 can be provided with distinct physical characteristics that are associated with different athletic skills. First pair of footwear 120 may be provided with first set of physical characteristics 140 that are used to perform or enhance the performance of a first athletic skill. Second pair of footwear 122 may be provided with second set of physical characteristics 142 that are used to perform or enhance the performance of a second athletic skill. Third pair of footwear 124 may be provided with third set of physical characteristics 144 that are used to perform or enhance the performance of a third athletic skill. Moreover, first set of physical characteristics 140, second set of physical characteristics 142, and third set of physical characteristics 144 are substantially different physical characteristics that are each associated with distinct athletic skills. In other words, the first athletic skill, the second athletic skill, and the third athletic skill are substantially different athletic skills.

In some embodiments, first set of physical characteristics 140 of first pair of footwear 120 can include physical characteristics that are configured to assist a user with controlling a ball during passes, kicking, and trapping. In some cases, first set of physical characteristics 140 may include shape correcting pads 141. Shape correcting pads 141 may help to present a smooth outer surface for an article of footwear in order to improve control over a ball. Examples of articles of footwear with shape correcting pads are disclosed in Baker et al., U.S. Pat. No. 8,196,321, issued on Jun. 12, 2012, the entirety of which is hereby incorporated by reference and referred to throughout the remainder of this detailed description as the "Baker application". Additionally, in some embodiments, additional provisions or features could be provided as part of first set of physical characteristics 140 for assisting a user with ball control or other athletic skills. In other embodiments, first set of physical characteristics 140 could be any other kind of physical characteristics associated with performing any other kind of athletic skill.

In some embodiments, second set of physical characteristics 142 of second pair of footwear 122 can include physical characteristics that are configured to assist a user with accurate kicking. In some cases, second set of physical characteristics 142 can include ball control portion 143. Ball control portion 143 may comprise a plurality of raised gripping members that can deflect during contact with a ball and provide increased spin in order to help curve a ball during shots on goal. Examples of articles of footwear with provisions for accurately kicking a ball, including provisions for applying enhanced spin on a ball, are disclosed in Atsumi et al., U.S. Pat. No. 8,196,322, issued on Jun. 12, 2012, the entirety of which is hereby incorporated by reference and referred to throughout the remainder of this detailed description as the "Atsumi application". Additionally, in some embodiments, additional provisions or features could be provided as part of second set of physical characteristics 142 for assisting a user with accurately kicking a ball and applying spin to a ball. In other embodiments, second set of physical characteristics 142 could be any other kind of physical characteristics associated with performing any other kind of athletic skill.

In some embodiments, third set of physical characteristics 144 of third pair of footwear 124 can include physical characteristics that are configured to assist a user with increased speed in the forward/rearward and/or lateral direction. In some cases, third set of physical characteristics 144 can include extendable traction elements 145 as well as stabilizing traction elements 146 (see FIG. 4) that provide increased traction with a ground surface as a user applies weight to the ball of the foot. This improved traction can enhance both forward and rearward speed as well as lateral speed. Examples of articles of footwear with extendable traction elements are disclosed in Auger, U.S. Pat. No. 8,453,349, issued on Jun. 4, 2013, the entirety of which is hereby incorporated by reference. Additionally, in some cases, third set of physical characteristics 144 could also include lightweight sole structures 147 (see FIG. 4) that help reduce the weight of third pair of footwear 124 to help improve speed. In some embodiments, additional provisions or features could be provided as part of third set of physical characteristics 144 for assisting a user with improved speed. In other embodiments, third set of physical characteristics 144 could be any other kind of physical characteristics associated with performing any other kind of athletic skill.

Each of these pairs of footwear include different physical characteristics or features that are intended to help improve a particular skill or set of skills for the user wearing the footwear. A user wearing first pair of footwear 120 may be better equipped to control a ball during dribbling and passing. A user wearing second pair of footwear 122 may be better equipped to accurately shoot a ball at a goal. A user wearing third pair of footwear 124 may be better equipped to run faster in the forward direction and/or make quicker cuts in the lateral direction. It will of course be understood that these physical characteristics are only intended to provide additional assistance for each associated athletic skill or set of skills and the levels of performance may vary depending on the skill level of the user.

It will be understood that the particular sets of physical characteristics described above are only intended to be exemplary and in other embodiments footwear with different physical characteristics that facilitate different athletic skills could be used. Furthermore, while the exemplary embodiments disclose articles of footwear intended to be used for soccer, other embodiments could include articles intended for different activities including other sports or athletic activities. In these cases, the particular kinds of physical characteristics will vary according to the types of athletic skills associated with each different kind of sport or activity.

In some embodiments, a group of footwear with physical characteristics associated with particular athletic skills can be associated with provisions for training a user to improve the associated athletic skills. The term "integrated training system" is used throughout this detailed description and in the claims to refer to the combination of footwear with particular physical characteristics and an associated customized training program that is specifically designed to be used in conjunction with the footwear having particular physical characteristics. The term "customized training program" as used throughout this detailed description and in the claims refers to any program for training a user in a manner that is customized for a particular athletic skill or set of skills. In some cases, each pair of footwear in a group of footwear can be associated with an integrated training system that includes a pair of footwear and an associated customized training program. Each customized training program can be custom tailored to train a user in a particular skill area associated with one type of footwear in the group of footwear.

First group of footwear 110 can be associated with one or more integrated training systems. An integrated training system associates a pair of footwear in first group of footwear 110 with a customized training program that is custom tailored to that pair of footwear. A customized training program can include instructions for training a user. The instructions can be provided in any format including, but not limited to: written instructions, pictures, videos, audible instructions as well as any combination thereof. Moreover, a customized training program may not be limited to a single training video, drill or set of instructions. Instead, in some cases, a customized training program can include a comprehensive set of videos, drills and/or other kinds of instructions that help train an athlete to improve a skill using multiple different approaches. For example, in some embodiments, a customized training drill could comprise a multi-session training program with multiple different training drills that train a user to improve in a particular skill area. In embodiments where training videos are used, the training videos could be organized in terms of a weekly progression that has a user viewing different videos, or different combinations of videos, each week.

In some embodiments, integrated training systems including customized training programs may only be provided for some groups of footwear. For example, the current embodiment includes four groups of footwear that may be sold by a manufacturer or retailer. First group of footwear 110 is associated with multiple integrated training systems, which include customized training programs for each pair of footwear in the group. These customized training programs are discussed in detail below. However, second group of footwear 112, third group of footwear 114, and fourth group of footwear 116 are not associated with any kind of integrated training system or customized training programs. In other words, in some embodiments, a manufacturer and/or retailer may limit an integrated training system with customized training programs to a particular group or sub-group of footwear within a larger category of footwear. For example, in the current embodiment a retailer may sell twelve different models of soccer shoes, however only three of those articles may be associated with customized training programs. In other embodiments, any number of articles of footwear could be associated with distinct customized training programs.

Figure 2:
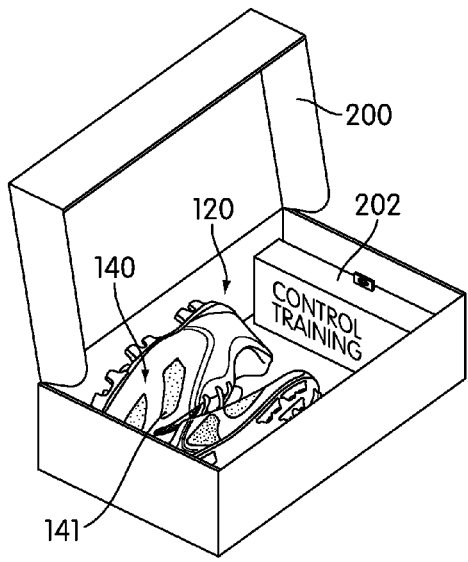
FIG. 2 is a schematic view of an embodiment of a pair of footwear packaged with a customized training program.
Figure 3:
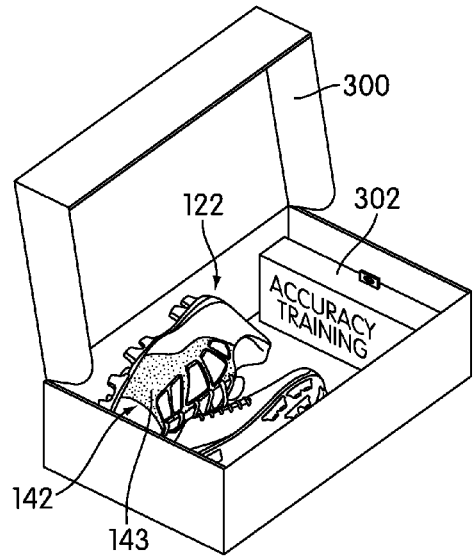
FIG. 3 is a schematic view of an embodiment of a pair of footwear packaged with a customized training program.
Figure 4:
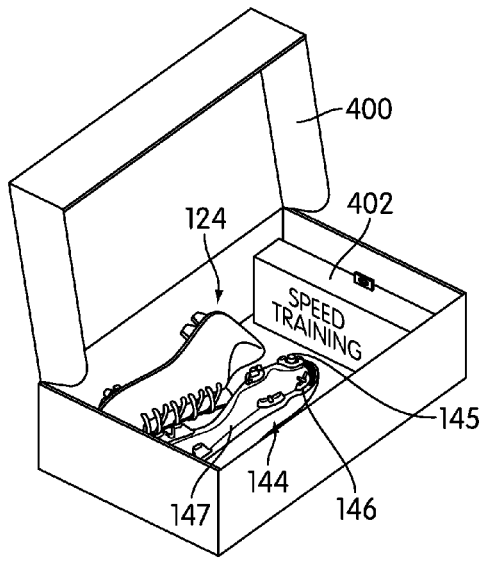
FIG. 4 is a schematic view of an embodiment of a pair of footwear packaged with a customized training program.

FIGS. 2 through 4 illustrate embodiments of three different types of footwear packaged with customized training programs. Referring to FIG. 2, first pair of footwear 120 is stored in first container 200. First container 200 can be any type of container configured to store at least one article of footwear. In some cases, first container 200 may be a box. In an exemplary embodiment, first container 200 may be a shoebox that is configured to store a pair of footwear.

First pair of footwear 120 may be associated with first customized training program 202. In some cases, first customized training program 202 may be packaged in a box that is also stored in first container 200. In other cases, however, first customized training program 202 may take any other form. First customized training program 202 may be a training program that is configured to help a user improve in a particular skill area that is associated with first set of physical characteristics 140. In one embodiment, first customized training program 202 may be a training program configured to train a user in controlling a ball. With this arrangement, first pair of footwear 120 and first customized training program 202 comprise an integrated training system that helps a user to increase control over a ball during passing, dribbling, and trapping. In particular, first customized training program 202 may provide training materials that teach a user better ball control while first pair of footwear 120 simultaneously facilitates better ball control using shape correcting pads 141.

Referring to FIG. 3, second pair of footwear 122 is stored in second container 300. Second pair of footwear 122 may be associated with second customized training program 302. In some cases, second customized training program 302 may be packaged in a box that is also stored in second container 300. In other cases, however, second customized training program 302 may take any other form. Second customized training program 302 may be a training program that is configured to help a user improve in a particular skill area that is associated with second set of physical characteristics 142. In one embodiment, second customized training program 302 may be a training program configured to train a user to accurately kick a ball or apply spin to a ball. With this arrangement, second pair of footwear 122 and second customized training program 302 comprise an integrated training system that helps a user to increase kicking accuracy by adding enhanced spin to a ball. This may allow a user to place a ball at the corners of a goal, for example, which can increase the chances of getting the ball past a goalie. Therefore, second customized training program 302 may provide training materials that teach a user improved kicking accuracy while second pair of footwear 122 simultaneously facilitates improved kicking accuracy using ball control portion 143.

Referring to FIG. 4, third pair of footwear 124 is stored in third container 400. Third pair of footwear 124 may be associated with third customized training program 402. In some cases, third customized training program 402 may be packaged in a box that is also stored in third container 400. In other cases, however, third customized training program 402 may take any other form. Third customized training program 402 may be a training program that is configured to help a user improve in a particular skill area that is associated with third set of physical characteristics 144. In one embodiment, third customized training program 402 may be a training program configured to train a user to improve forward and/or lateral speed. With this arrangement, third pair of footwear 144 and third customized training program 402 comprise an integrated training system that helps a user to improve speed. In particular, third customized training program 402 may provide training materials that train a user to improve his or her forward and/or lateral speed, while third pair of footwear 124 simultaneously facilitates increased speed through improved traction provided by extendable traction elements 145 and stabilizing traction elements 146, as well as through the reduced weight of lightweight sole structure 147.

Figure 5:
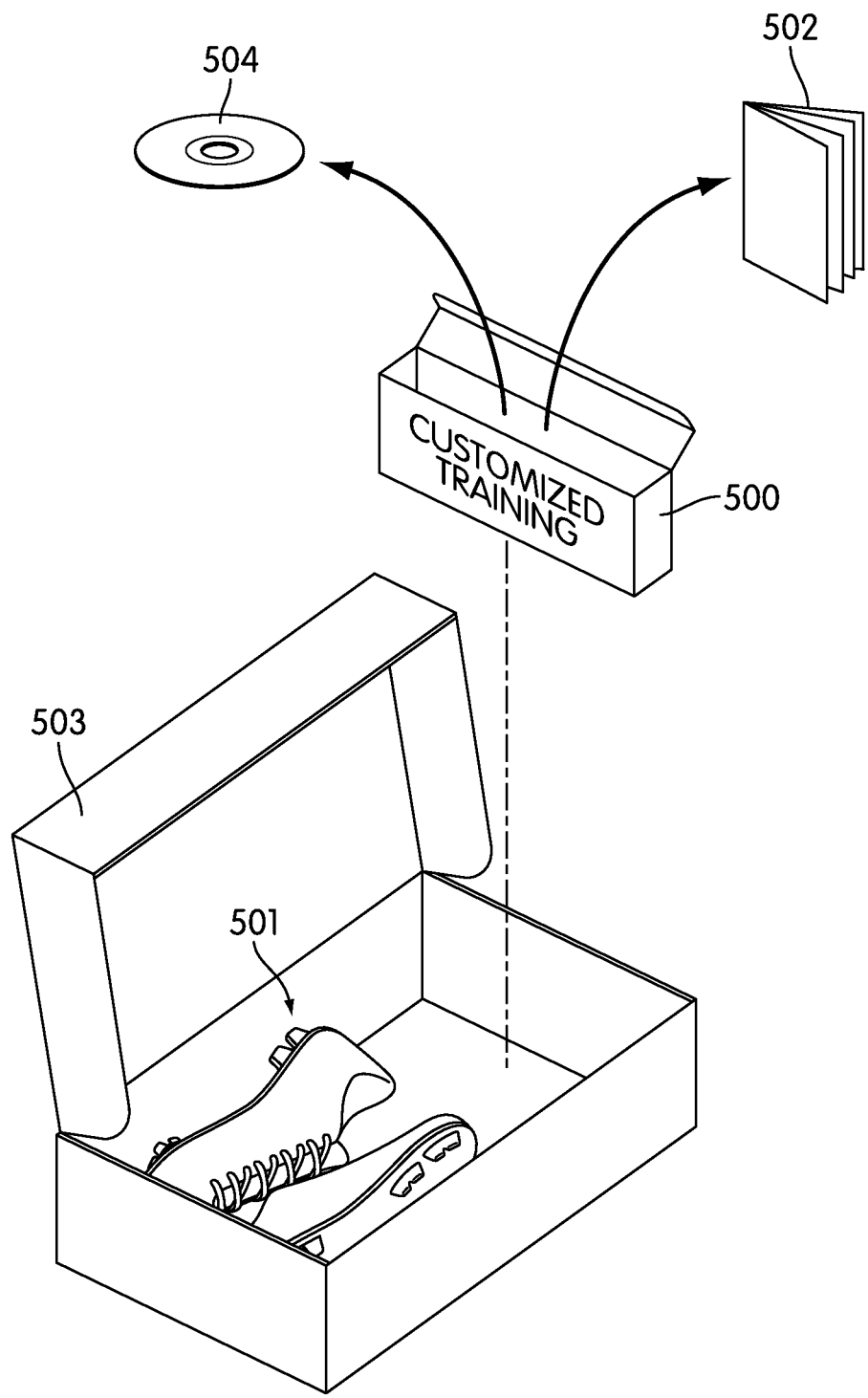
FIG. 5 is a schematic view of an embodiment of various formats for a customized training program.

FIG. 5 illustrates an exemplary embodiment of different formats for a customized training program. Referring to FIG. 5, a customized training program can include one or more sets of training instructions. The term "training instructions" as used throughout this detailed description and in the claims refers to any instructions that can be used to train an athlete or user. Training instructions can be provided as written instructions, pictures, videos, audible instructions as well as any combination thereof.

In different embodiments, training instructions could be provided in different formats. In some cases, training instructions could be provided as paper based or printed instructions. In other cases, training instructions could be provided on various types of removable media. The term "removable media" refers to any media that can be inserted into a media reading device such as a computer, optical media player (including DVD players, CD players and Blu-ray players) or any other type of media reading device. Examples of removable media include, but are not limited to: computer disks, CDs, CD-ROMs, DVDs, Blu-rays discs, HD-DVD discs, removable hard drives, digital memory cards and flash drives as well as any other types of media that can be used with a media reading device.

In the current embodiment, customized training program 500 may be packaged with pair of footwear 501 within container 503. Pair of footwear 501 may include a set of physical characteristics associated with a particular athletic skill. In this case, customized training program 500 may be a training program tailored to teach a user to improve the particular athletic skill which is associated with pair of footwear 501.

In some embodiments, customized training program 500 may include instruction booklet 502. Instruction booklet 502 may be a set of printed instructions that is packaged with pair of footwear 501 in container 503. In some embodiments, customized training program 500 may include digital based instructions in the form of removable media 504. Removable media 504 may be inserted into a media reading device, including a computer or dedicated media player, for purposes of accessing training instructions. In one embodiment, removable media 504 may take the form of a DVD or CD-ROM. In other embodiments, customized training program 500 could include any other type of removable media including various memory cards, thumb drives, disks, or other devices for storing training instructions and related information.

In the current embodiment, customized training program 500 may be associate with a box or package within which various kinds of training materials can be stored. Although the current embodiment associates customized training program 500 with a box, in other embodiments customized training program 500 may not be associated with any type of physical packaging that is sold with a pair of footwear. Instead, in some cases, customized training program 500 could refer to any form of training information that may be stored in various formats including information that is remotely accessible through a network such as the Internet.

Figure 6:
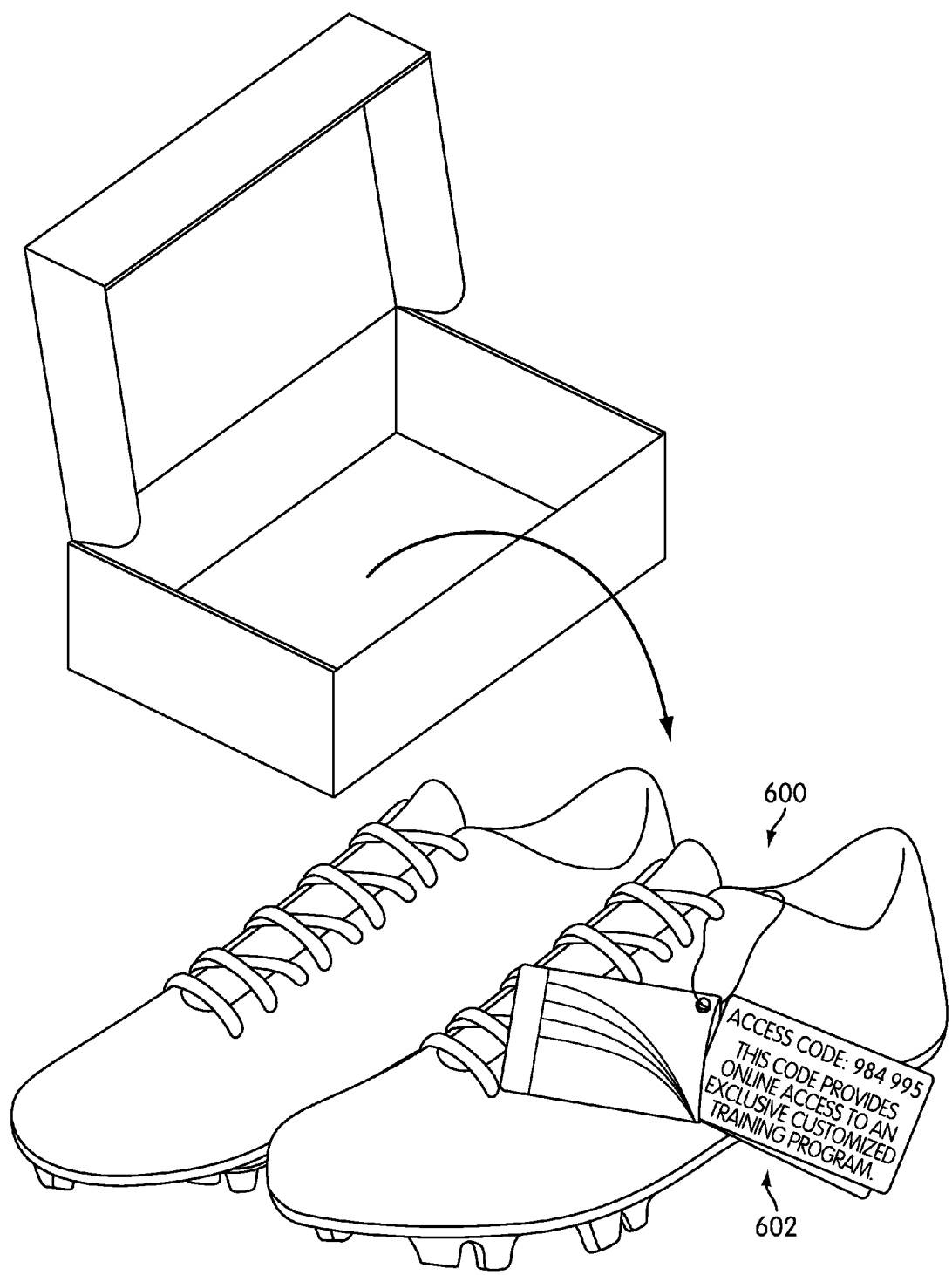
FIG. 6 is an isometric view of an embodiment of a pair of footwear with a card providing access to a customized training program.

A customized training program could be provided with information for accessing training instructions remotely. FIG. 6 illustrates another embodiment of a method of providing a customized training program with a pair of footwear. Referring to FIG. 6, pair of footwear 600 may be associated with card 602. Card 602 may include a code that provides access to a customized training program that may be accessed remotely using a computer. In some cases, the customized training program may be stored as online material on a website that can be accessed through a network such as the Internet. In particular, in one embodiment, card 602 may include an address for a website as well as any necessary access information such as a user ID and/or user password. In still other embodiments, card 602 could provide a user with information for obtaining one or more software programs that may include training instructions. For example, in one embodiment, card 602 could include information for downloading a software based training application on a computer or mobile device. Using this arrangement, a user can be provided with instant access to a wide variety of customized training materials online after purchasing footwear that is associated with enhancing one or more athletic skills.

Figure 7:
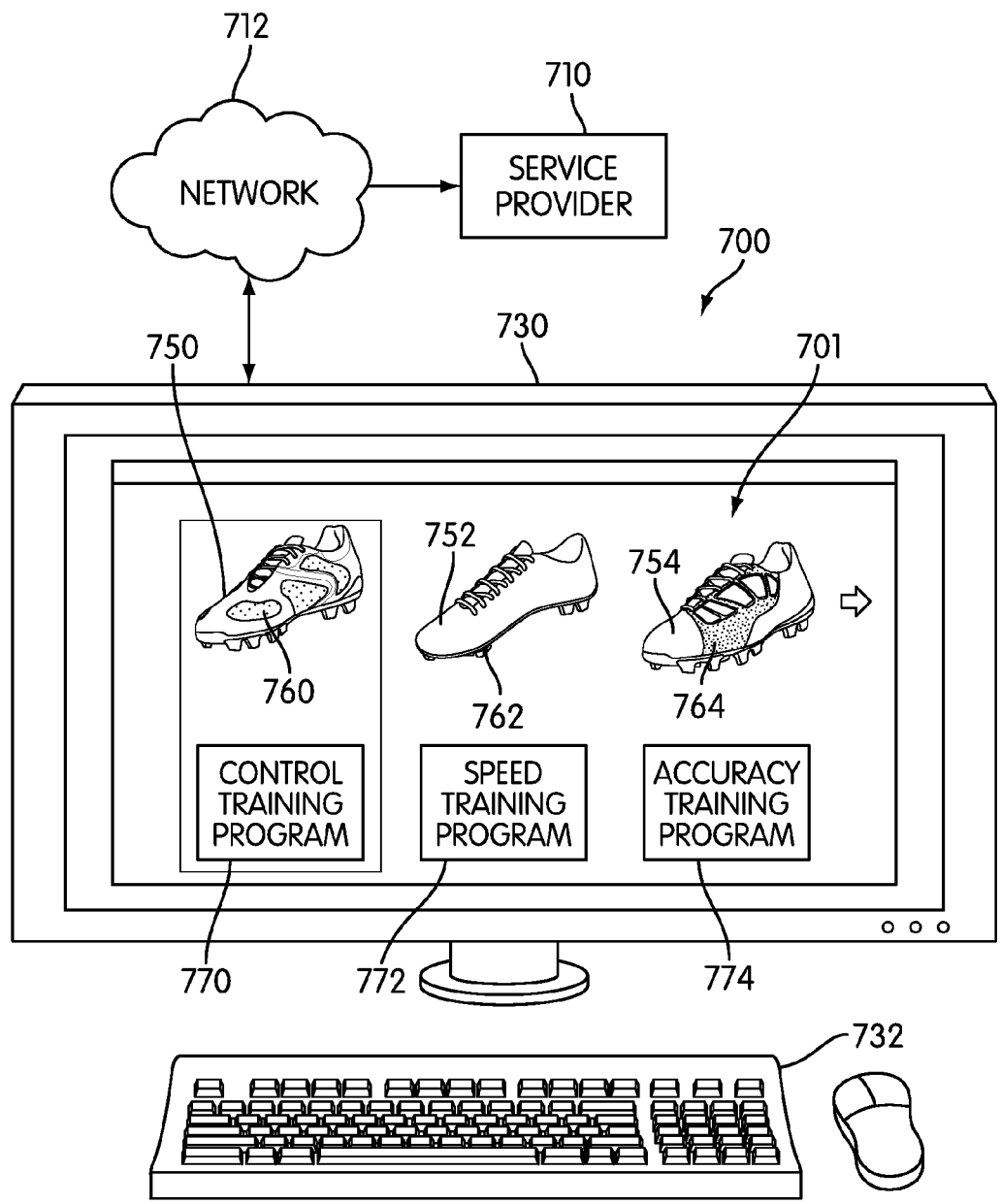
FIG. 7 is a schematic view of an embodiment of an online retail environment for selling articles of footwear with associated customized training programs.

FIG. 7 illustrates an embodiment of an online retail environment for selling articles of footwear with different physical characteristics and associated customized training programs. Referring to FIG. 7, a user can access online retail environment 701 using computing device 700. Computing device 700 may be any type of computer, including either a desktop or a laptop computer. In other embodiments, computing device 700 may be any type of device that includes a display and a processor. In some cases, computing device 700 may also include provisions for transmitting and receiving information from a remote network. Examples of such devices include, but are not limited to: PDA's, cell phones, as well as other types of devices.

Computing device 700 can include display device 730 for viewing articles of footwear and/or customized training programs. In some cases, computing device 700 can also include input devices 732. In this case, input devices 732 may comprise a keyboard and a mouse.

Computing device 700 may be used to access an online retail environment with footwear and/or customized training programs. In some embodiments, an online retail environment may be stored at a service provider 710. Service provider 710 may be any remote system capable of hosting an online retail environment. In some cases, service provider 710 could comprise one or more servers. With this arrangement, a user could view and in some cases purchase articles of footwear and/or customized training programs from the website.

Computing device 700 may be configured to access service provider 710 using network 712. Generally, network 712 may be a system allowing for the exchange of information between computing device 700 and service provider 710. Examples of such networks include, but are not limited to: personal area networks, local area networks, wide area networks, client-server networks, peer-to-peer networks, as well as other types of networks. Additionally, the network may support wired transmissions, wireless transmissions, or both wired and wireless transmissions. In some embodiments, network 712 may be a packet-switched communications system. In an exemplary embodiment, network 712 may be the Internet.

In the current embodiment, online retail environment 701 provides a user an option to purchase various different articles of footwear. In this case, first article of footwear 750, second article of footwear 752, and third article of footwear 754 are shown. Each different article of footwear may be associated with different physical characteristics that are associated with different skill areas. For example, first article of footwear 750 may be associated with shape correcting pads 760 that help provide ball control. Second article of footwear 752 may be associated with extendable traction elements 762 that can help improve forward and/or lateral speed. Third article of footwear 754 may be associated with ball control portion 764 that helps improve kicking accuracy. Although the current embodiment illustrates three examples of articles with different physical characteristics, it should be understood that in other embodiments other articles with different physical characteristics could also be provided in online retail environment 701.

Each article of footwear can be further associated with a customized training program that is tailored to train a user in a particular skill set. For example, first article of footwear 750 can be associated with control training program 770 that helps train a user to improve ball control. Also, second article of footwear 752 can be associated with speed training program 772 that helps a user to improve speed. In addition, third article of footwear 754 can be associated with accuracy training program 774 that helps a user to improve kicking accuracy. With this arrangement, control training program 770, speed training program 772, and accuracy training program 774 provide customized training programs associated with first article of footwear 750, second article of footwear 752, and third article of footwear 754, respectively.

As previously discussed, a customized training program could be provided in a variety of different formats including written instructions, videos and/or audible formats. In some embodiments, a customized training program can be provided as one or more training videos. In some cases, training videos could be stored and accessed through removable media. In other cases, training videos could be accessed from a website using the Internet.

In some embodiments, a user can purchase articles of footwear and retrieve customized training materials through a single online website. For example, in some cases, upon ordering a pair of footwear with particular physical characteristics, a user could be given automatic access to training materials related to an associated customized training program for the purchased footwear. In other cases, upon receiving an access code that is sold with a pair of footwear from either an online store or a retail store, a user can unlock training material from the retailer or manufacturer's website. In one embodiment, for example, a user could obtain training materials from a website using computing device 700, which provides access to service provider 710 through network 712.

Figure 8:
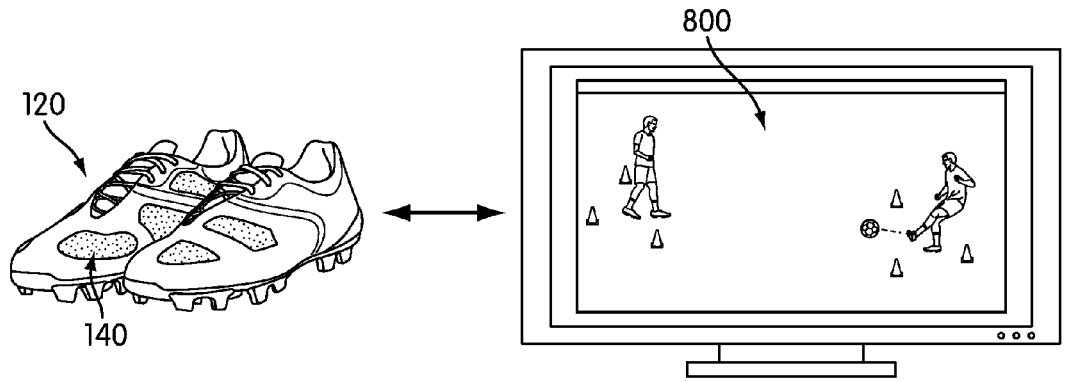
FIG. 8 is a schematic view of an embodiment of a pair of footwear associated with a customized training program.
Figure 9:
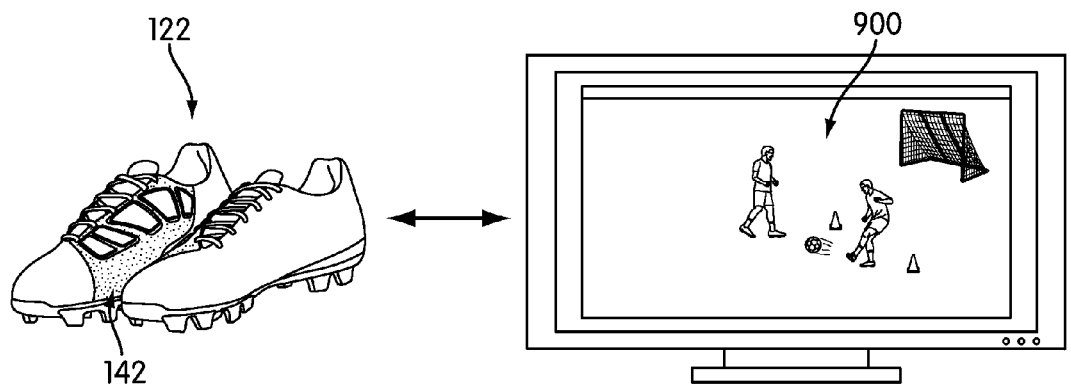
FIG. 9 is a schematic view of an embodiment of a pair of footwear associated with a customized training program.
Figure 10:
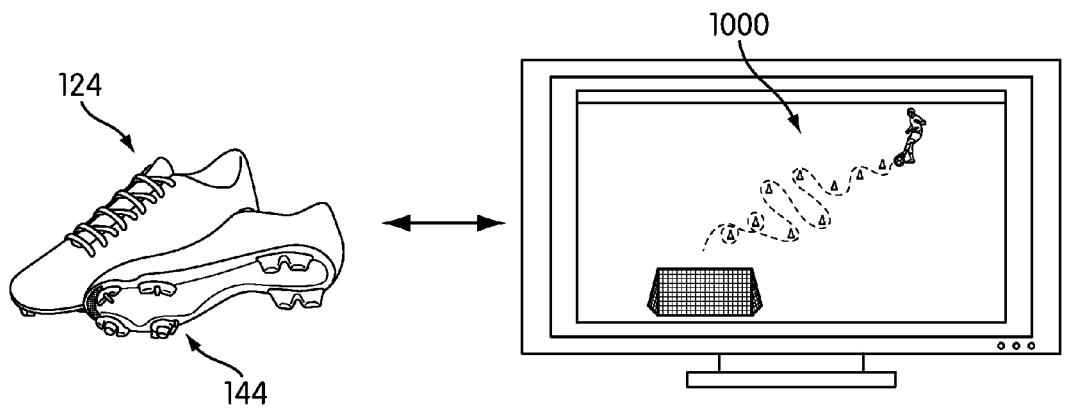
FIG. 10 is a schematic view of an embodiment of a pair of footwear associated with a customized training program.

FIGS. 8 through 10 illustrate embodiments of customized training programs for various different articles of footwear. Referring to FIGS. 8 through 10, each customized training program could include a customized training video. First pair of footwear 120 may be associated with first customized training video 800. First customized training video 800 provides instructions for a training drill that facilitates learning ball control. In this case, first customized training video 800 directs two athletes to pass a ball back and forth from within adjacent control zones, which are triangular regions designated by various markers or cones. Specific directions may be given for the number of times the ball should be passed, the size of each control zone as well as specific directions for trapping the ball.

It will be understood that first customized training video 800 is only intended to be an example of one kind of training drill that could be used with a customized training program for improving ball control. A detailed description of various types of training videos and drills for improving ball control is disclosed in Morag, U.S. Patent Application Publication Number U.S. 2010/0304346, published on Dec. 2, 2010, the entirety of which is hereby incorporated by reference.

Second pair of footwear 122 may be associated with second customized training video 900. Second customized training video 900 provides instructions for a training drill that facilitates increased kicking accuracy. In this case, second customized training video 900 directs an athlete to receive a ball from another athlete and take a shot on goal. Specific instructions could be given for passing the ball between athletes, the distance that the shot should be taken from, as well as other instructions for facilitating improved shooting accuracy.

It will be understood that second customized training video 900 is only intended to be an example of one kind of training drill that could be used with a customized training program for improving kicking accuracy. A detailed description of training videos and drills for improving kicking accuracy is disclosed in Morag, U.S. Patent Application Publication Number U.S. 2010/0331122, published on Dec. 30, 2010, the entirety of which is hereby incorporated by reference.

Third pair of footwear 124 may be associated with third customized training video 1000. Third customized training video 1000 provides instructions for a training drill that facilitates increased forward and/or lateral speed. In this case, third customized training video 1000 directs an athlete to dribble a ball around a plurality of markers or cones. Specific directions may be given for the relative locations of each marker or cone as well as other instructions relevant to this particular speed drill.

It will be understood that training video 1000 is only intended to be an example of one kind of training drill that could be used with a customized training program for improving speed. A detailed description of training videos and drills for improving forward and/or lateral speed is disclosed in Morag, U.S. Patent Application Publication Number U.S. 2011/0045926, published on Feb. 24, 2011, the entirety of which is hereby incorporated by reference.

For purposes of clarity, a single training drill is shown for each different type of footwear. However, it will be understood that in some embodiments a customized training program can incorporate a plurality of different training drills in the form of training videos, written directions as well as any other kinds of training materials. In some embodiments, for example, a customized training program can be a multi-session training program that trains a user over multiple sessions. Each session could incorporate different kinds of drills, routines and/or other kinds of training materials.

In some embodiments, a customized training program could incorporate a training schedule that assigns a particular drill or combination of drills for each day of the training period. In some cases, the training drills could increase in difficulty as a user progresses through the training period. The training period could be associated with any period of time including days, weeks, months or years. In one embodiment, a training period may comprise a month of daily (or almost daily) training routines including various drills. Each drill may facilitate improvement in one or more related skill areas. For example, a customized training program for a pair of footwear associated with a set of physical characteristics intended to help improve speed could include training drills for improving lateral speed as well as training drills for improving forward or rearward speed. Likewise, a customized training program for a pair of footwear associated with a set of physical characteristics intended to help improve control of a ball could include training drills for improving passing as well as training drills for improving trapping.

A multi-session training program could include provisions for storing and/or tracking user progress. For example, in embodiments where training programs are accessible as a series of training videos through a website, the training program could include an automated or manual system for tracking the progress of the user as each drill is completed. Moreover, the system could provide information in the form of progress charts or any other information that allows a user to view his or her progress throughout the course of a training program.

Figure 11:
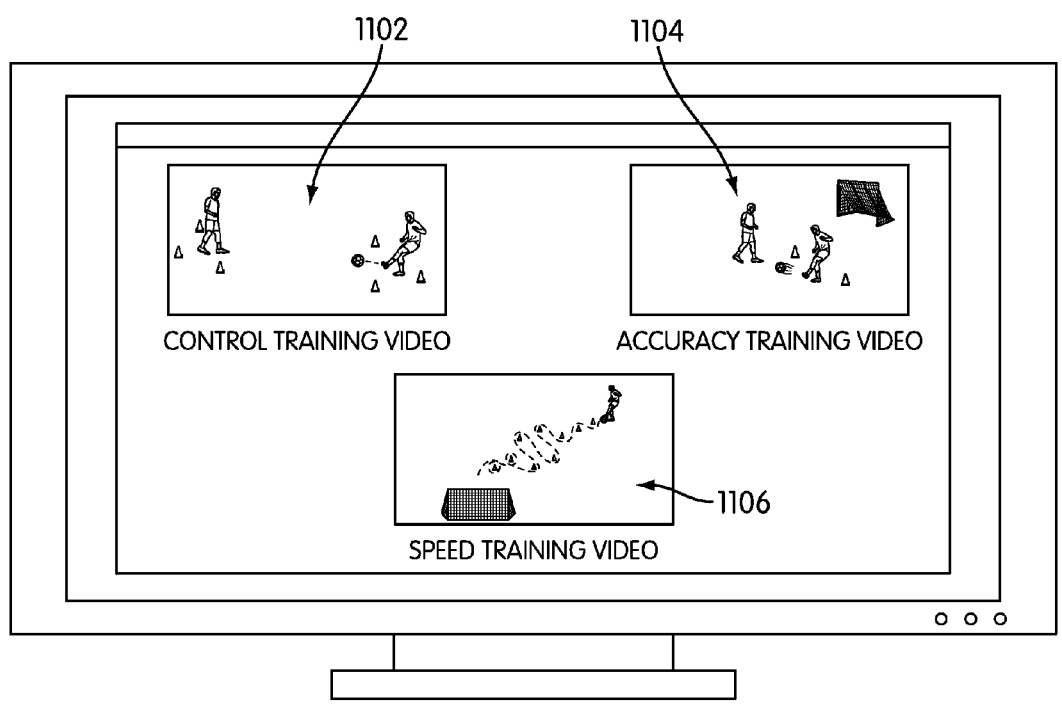
FIG. 11 is a schematic view of an embodiment of different training videos associated with different customized training programs.

In some embodiments, different customized training programs provided as training videos could be organized as separate training videos. For example, in the embodiment shown in FIG. 11, each customized training program is associated with separate training videos that may be accessed using a computer. In this case, first training video 1102 is associated with a control training video that includes drills for improving ball control. Second training video 1104 is associated with an accuracy training video that includes drills for improving shooting accuracy. Third training video 1106 is associated with a speed training video that includes drills for improving speed. Each training video may be viewed as a standalone video. Although three different types of training videos are shown here, users may not be given access to all different types of training videos and instead may be given access to training videos associated with a particular skill set.

In other embodiments, different customized training programs provided as training videos could be organized as a single training video with multiple segments or sections. The term "segment" can include any division of a training video. In some cases, a segment could be associated with a chapter of a video. In other cases, different segments could be associated with different tracks. In still other cases, different segments could be associated with any other kinds of subdivisions or indexed locations in a video.

Figure 12:
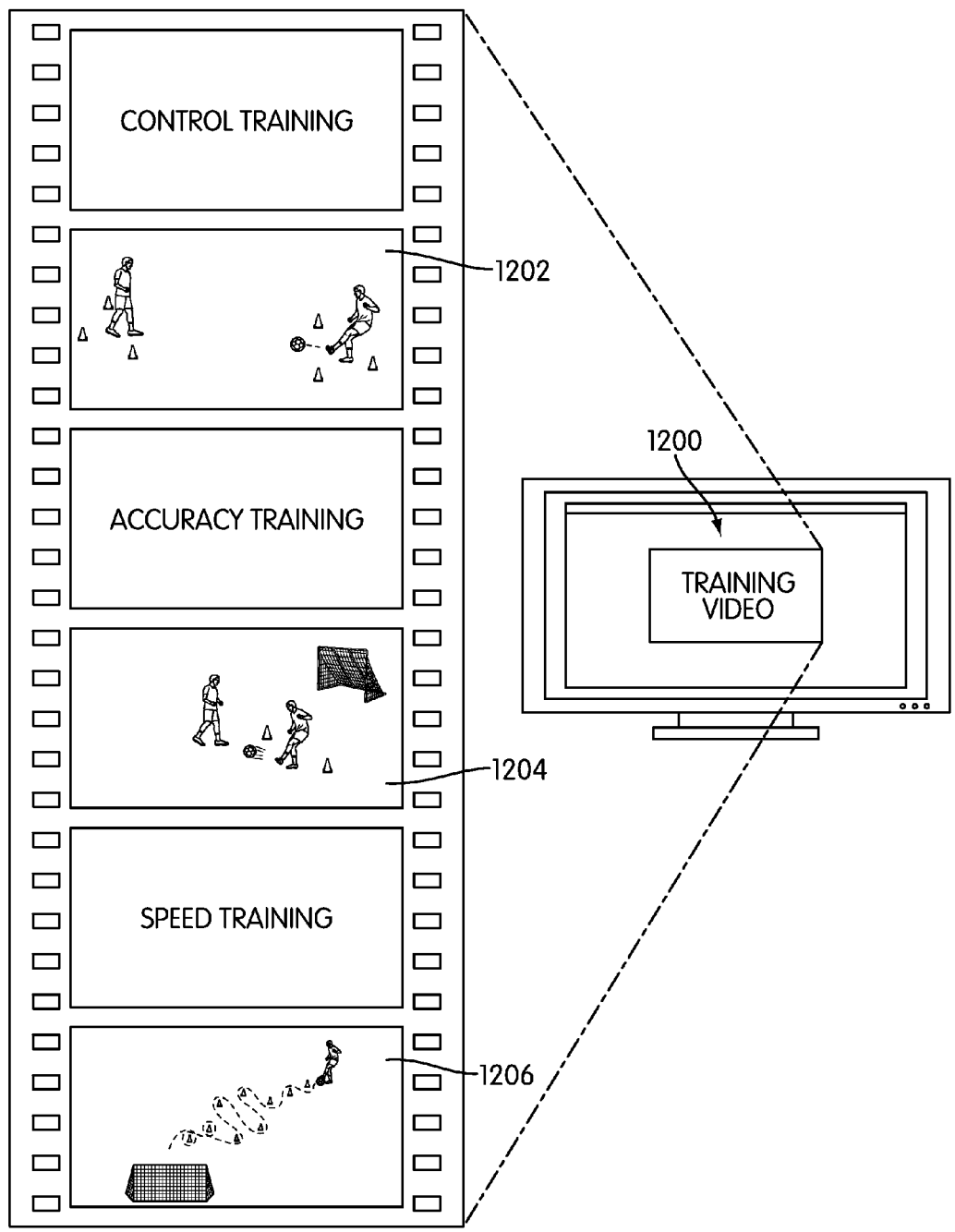
FIG. 12 is a schematic view of an embodiment of a single video associated with different customized training programs.

For example, in the embodiments shown in FIG. 12, each customized training program is associated with a single training video that may be accessed using a computer. In particular, training video 1200 includes multiple training segments. First segment 1202 is associated with a portion of a video showing drills for improving ball control. Second segment 1204 is associated with a portion of a video showing drills for improving kicking accuracy. Third segment 1206 is associated with a portion of a video showing drills for improving forward and lateral speed. With this arrangement, different types of drills for improving different skill areas can be viewed in a single training video rather than as separate videos.

An integrated training system can include provisions for allowing users to complete skill challenges or tests according to the type of footwear purchased by the user. In some cases, access to training materials may include access to specific challenges designed to test a particular skill associated with a particular type of article. For example, a training system associated with articles of footwear with a specialized traction system may provide a user with access to a speed challenge or test. Upon completing the speed test, a user may post his or her score online. This arrangement provides for increased motivation for helping the user to train with an integrated training system.

Figure 13:
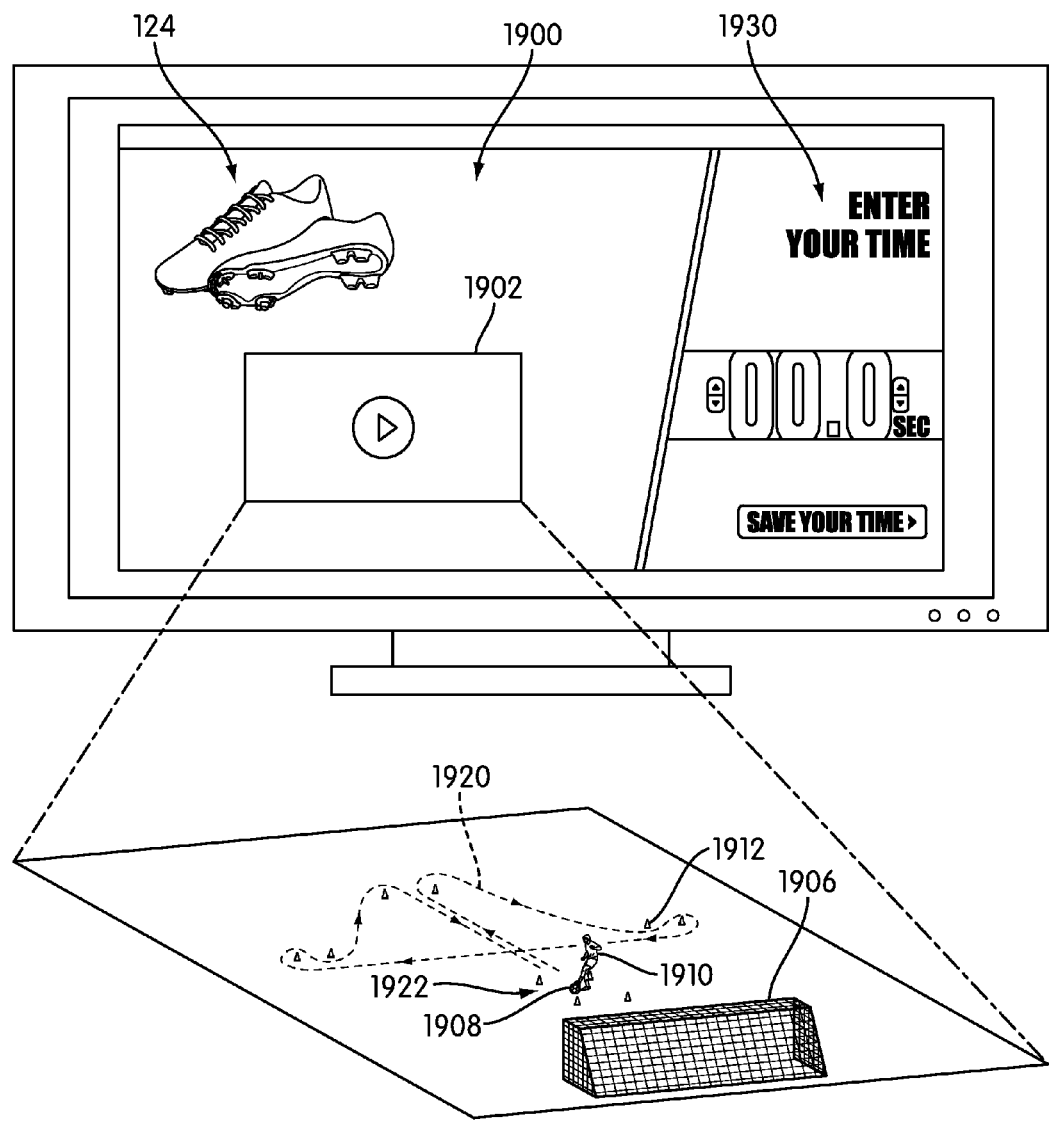
FIG. 13 illustrates a schematic view of an embodiment of a speed test for an integrated training system.

FIG. 13 illustrates an embodiment of an online challenge or test for users. Referring to FIG. 13, speed test 1900 may be provided for users on a website associated with a training system. In some cases, speed test 1900 may be associated with third pair of footwear 124, which includes specialized traction elements for improving speed.

Speed test 1900 comprises instructional video 1902. Instructional video 1902 provides a video demonstration of a particular speed drill that a user may complete. In the current embodiment, instructional video 1902 shows athlete 1910, markers 1912, goal 1906 and ball 1908. Moreover, instructional video 1902 indicates a particular path 1920 that athlete 1910 must take from starting area 1922 around markers 1912 before returning to starting area 1922. Upon returning to starting area 1922, athlete 1910 takes a shot into either corner of goal 1906.

A user may attempt to complete the test using the same arrangement of markers and a goal. In some cases, instructional video 1902 may include specified dimensions for spacing between various markers, the path taken as well as any other instructions for performing the drill. In other cases, additional written instructions could also be provided with instructional video 1902 for explaining various details required to carry out the drill.

In some cases, a user may complete the test while being timed using a stopwatch or similar device. This allows the user the opportunity to test his or her athletic skills. In this case, speed test 1900 allows a user to test his or her speed skills since the drill involves moving around the markers quickly in a manner that tests lateral and forward speed.

Speed test 1900 also comprises results portion 1930. Results portion 1930 may include a place for a user to enter his or her time for completing the speed test. For example, if it takes a user 25.3 seconds to complete a drill, the user would enter 25.3 seconds into results portion 1930. In some cases, the results could be posted to an online leader board so that a user can compare their times to other athletes. In other cases, the results could be shared between friends. In still other cases, the results could be used to pick users to receive various prizes or other recognition.

Although the test shown in the current embodiment is provided through a website, in other cases tests could be provided in any other format. In some cases, upon purchasing an integrated training system with footwear and training materials, the training materials may come with a written set of instructions for one or more tests. The test results could be submitted through a website, email, over the phone, by mail or through any other format.

Figure 14:
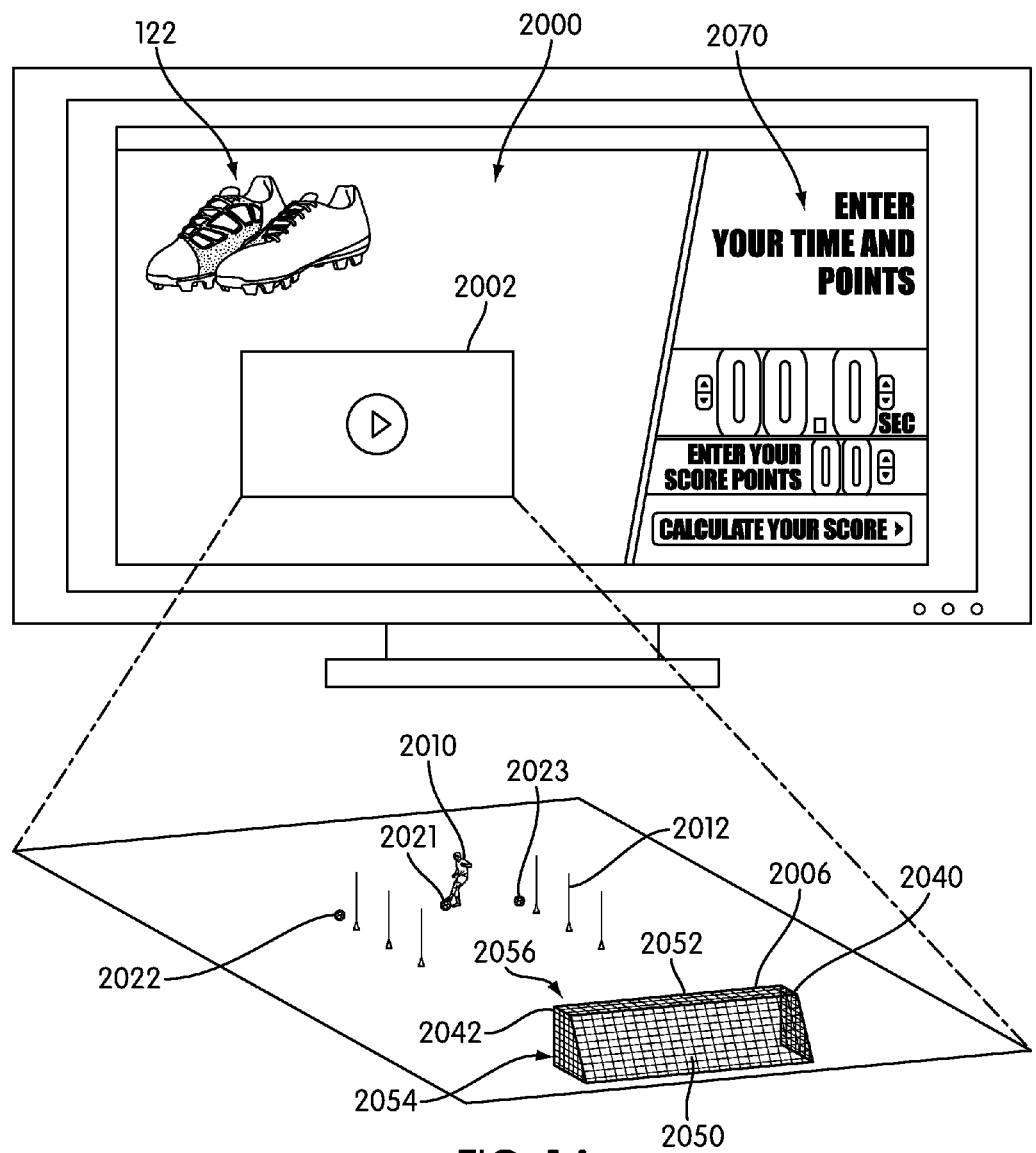
FIG. 14 illustrates a schematic view of an embodiment of an accuracy test for an integrated training system.
Figure 15:
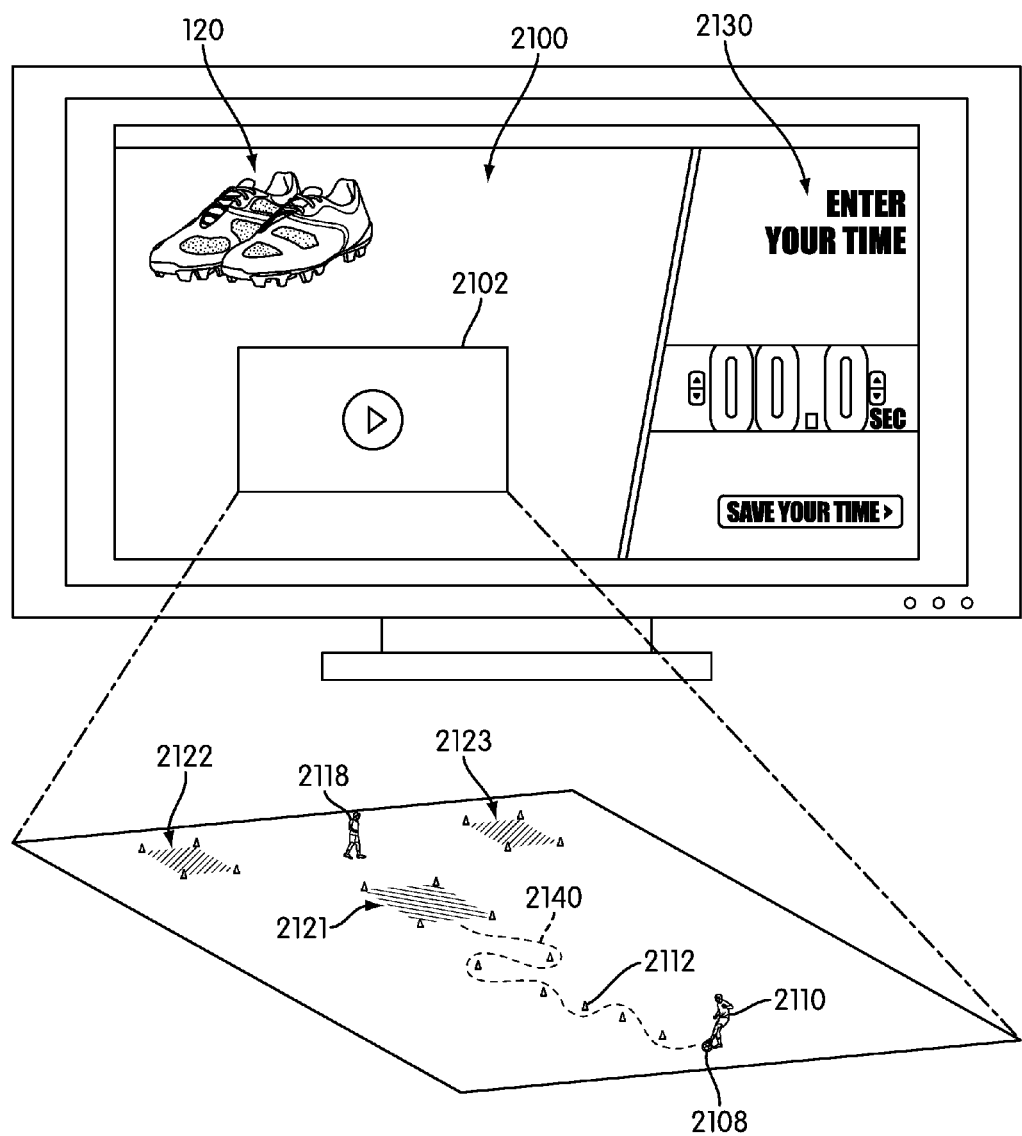
FIG. 15 illustrates a schematic view of an embodiment of a control test for an integrated training system.

FIGS. 14 and 15 illustrate additional embodiments of challenges or tests for users. Referring to FIG. 14, accuracy test 2000 may be provided for users on a website associated with a training system. In some cases, accuracy test 2000 may be associated with second pair of footwear 122, which includes provisions for improving shooting accuracy.

Accuracy test 2000 comprises instructional video 2002. Instructional video 2002 provides a video demonstration of a particular accuracy drill that a user may complete. In the current embodiment, instructional video 2002 shows athlete 2010, markers 2012 and goal 2006. Markers 2012 could be cones, poles or bags. In addition, instructional video 2002 shows first ball 2021, second ball 2022 and third ball 2023. In this case, athlete 2010 juggles first ball 2021, turns and volleys first ball 2021 into goal 2006. Next, athlete 2010 passes second ball 2022 around markers 2012, while weaving through markers 2012 and finally shoots second ball 2022 into corner 2040 of goal 2006. Next, athlete 2010 passes third ball 2023 around markers 2012, while weaving through markers 2012 and finally shoots third ball 2023 into corner 2042 of goal 2006.

A user may attempt to complete the challenge using the same arrangement of markers and a goal. In some cases, instructional video 2002 may include specified dimensions for spacing between various markers. In other cases, additional written instructions could also be provided with instructional video 2002 for explaining the placement of each marker relative to the goal. Additionally, instructions for each step of the drill could also be provided in video or written formats.

In some cases, a user may complete the test while being timed using a stopwatch or similar device. This allows the user the opportunity to test his or her athletic skills. In this case, accuracy test 2000 allows a user to test his or her speed skills since the drill involves moving around the markers quickly in a manner that tests the accuracy of each shot on goal.

In the current example, a user may also be scored according to the location where each ball hits goal 2006. For example, in some cases, a user may receive 2 points for each ball hitting rear side 2050 of net 2052. Also, a user may receive 4 points for each ball hitting sides 2054 of net 2052. In addition, a user may receive 10 points for each ball hitting top corners 2056 of net 2052. It will be understood that this particular assignment of points is only exemplary and in other embodiments other assignments of points are possible. Using this arrangement, a user may tally a total score at the end of the test in addition to a time for completing the test.

Accuracy test 2000 also comprises results portion 2070. Results portion 2070 may include a place for a user to enter his or her time for completing the speed test. In addition, results portion 2070 could include a place for a user to enter his or her points scored during the test. In some cases, a total score, which combines time and points could be calculated as well. In some embodiments, the results could be posted to an online leader board so that a user can compare their times to other athletes. In other cases, the results could be shared between friends. In still other cases, the results could be used to pick users to receive various special prizes.

FIG. 15 illustrates an embodiment of an online challenge or test for users. Referring to FIG. 15, control test 2100 may be provided for users on a website associated with a training system. In some cases, control test 2100 may be associated with first pair of footwear 120, which includes provisions for increasing ball control.

Control test 2100 comprises instructional video 2102. Instructional video 2102 provides a video demonstration of a particular control drill that a user may complete. In the current embodiment, instructional video 2102 shows athlete 2110, markers 2112 and ball 2108. In addition, a second athlete 2118 is also shown. Furthermore, some of markers 2112 are arranged into first control area 2121, second control area 2122 and third control area 2123. Moreover, instructional video indicates a particular path 2140 that athlete 2110 must take around some of markers 2112. Upon arriving at first control area 2121, athlete 2110 juggles ball 2108, then spins and passes ball 2108 to second athlete 2118 who has moved to one of second control area 2122 or third control area 2123.

A user may attempt to complete the challenge using the same arrangement of markers and a goal. A second user may also provide assistance. In some cases, instructional video 2102 may include specified dimensions for spacing between various markers as well as instructions for taking a particular path through the markers. In other cases, additional written instructions could also be provided with instructional video 2102 for explaining the placement of each marker relative to the goal.

In some cases, a user may complete the test while being timed using a stopwatch or similar device. This allows the user the opportunity to test his or her athletic skills. In this case, control test 2100 allows a user to test his or her control skills since the drill involves moving around the markers quickly in a manner that tests ball control.

Control test 2100 also comprises results portion 2130. Results portion 2130 may include a place for a user to enter his or her time for completing the control test. In some cases, the results could be posted to an online leader board so that a user can compare their times to other athletes. In other cases, the results could be shared between friends. In still other cases, the results could be used to pick users to receive various special prizes.

Using this arrangement, an integrated training program provides customized skill tests that are specific to the types of skills enhanced by a particular type of footwear. This allows a user to monitor his or her progress throughout the course of a customized training program. In addition, this allows users to track their progress alongside of other users who have access to similar integrated training systems.

A training system can include provisions for allowing a user to obtain access to various special events that are associated with a customized training program. In some cases, purchasing a pair of footwear with an associated customized training program provides a user with an invitation to various special events including sporting games, promotional events or any other events. The term "special event" is not intended to be limiting and can include any type of event or activity. In situations where soccer footwear is sold with customized training programs, special events could include any soccer related events.

In some cases, purchasing a pair of footwear associated with a customized training program provides a user with an invitation to take part in a special training event. For example, in some cases, a user could receive a field pass that allows them to take part in a special training session with various athletes at a special event. This provides an expanded training experience for the user who is able to participate in training activities with athletes who have mastered various different athletic skills that may be relevant to a customized training program and associated articles of footwear.

Figure 16:
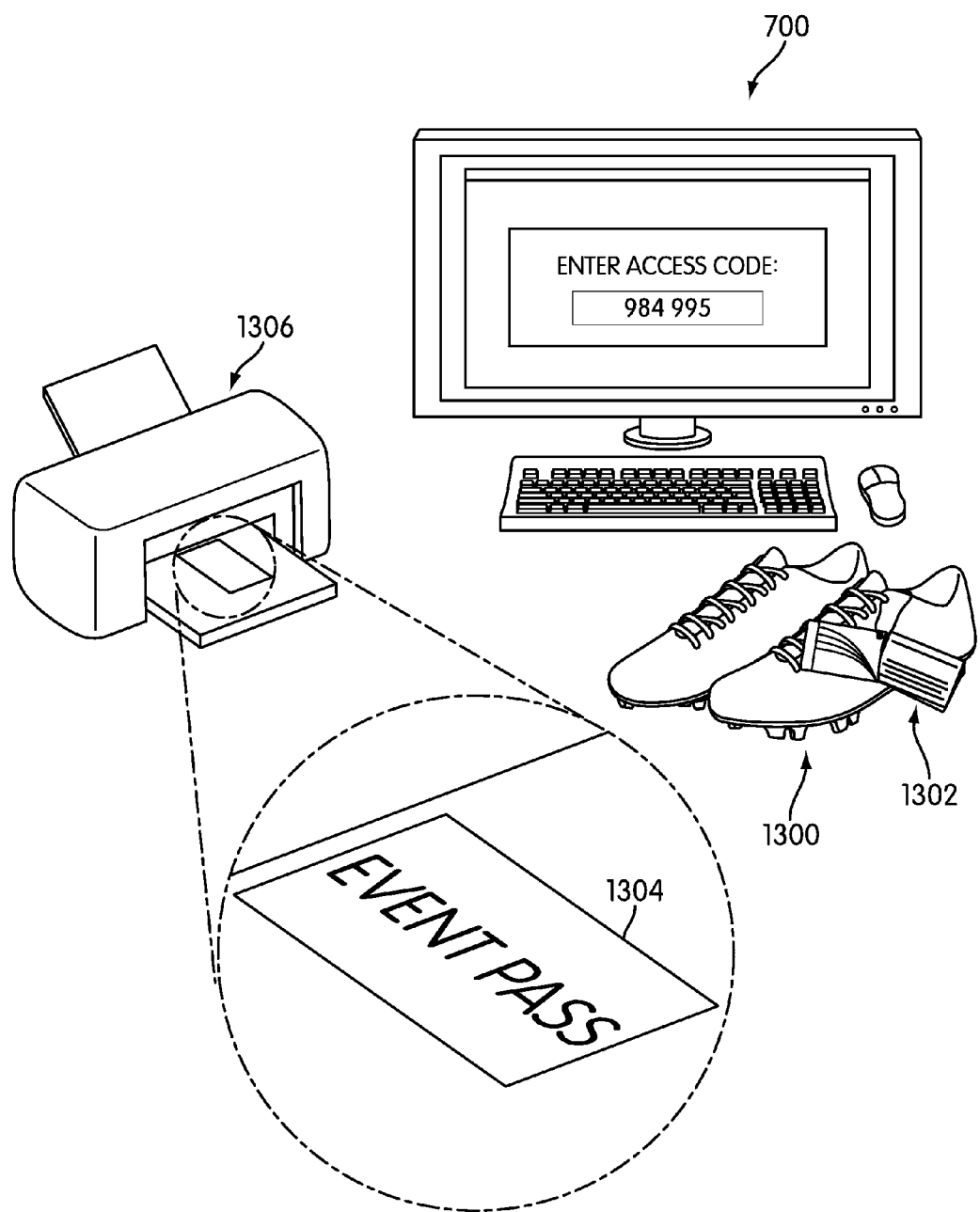
FIG. 16 is a schematic view of an embodiment of a method of obtaining a special event pass associated with a customized training program.

FIG. 16 is an exemplary embodiment of a system for providing a user access to one or more special events. Referring to FIG. 16, a user may purchase pair of footwear 1300. In some cases, pair of footwear 1300 may be any kind of footwear with physical characteristics that are associated with a particular skill area. For example, in some cases, pair of footwear 1300 could include extendable traction elements that help increase traction and improve speed. Pair of footwear 1300 may be sold with card 1302. Card 1302 may provide a user with an access code that unlocks online content that includes various materials for a customized training program such as training videos and other types of training material.

Additionally, in some embodiments, card 1302 could be used to obtain access to one or more passes to various special events. For example, in the current embodiment, a user may use an access code provided with card 1302 to obtain event pass 1304. In some cases, the access code could be entered at a website that is accessed using computing device 700.

In some cases, event pass 1304 could be an electronic pass that is stored online. In other cases, event pass 1304 could be printed from a website using printer 1306. In still other cases, event pass 1304 could take any other form.

Figure 17:
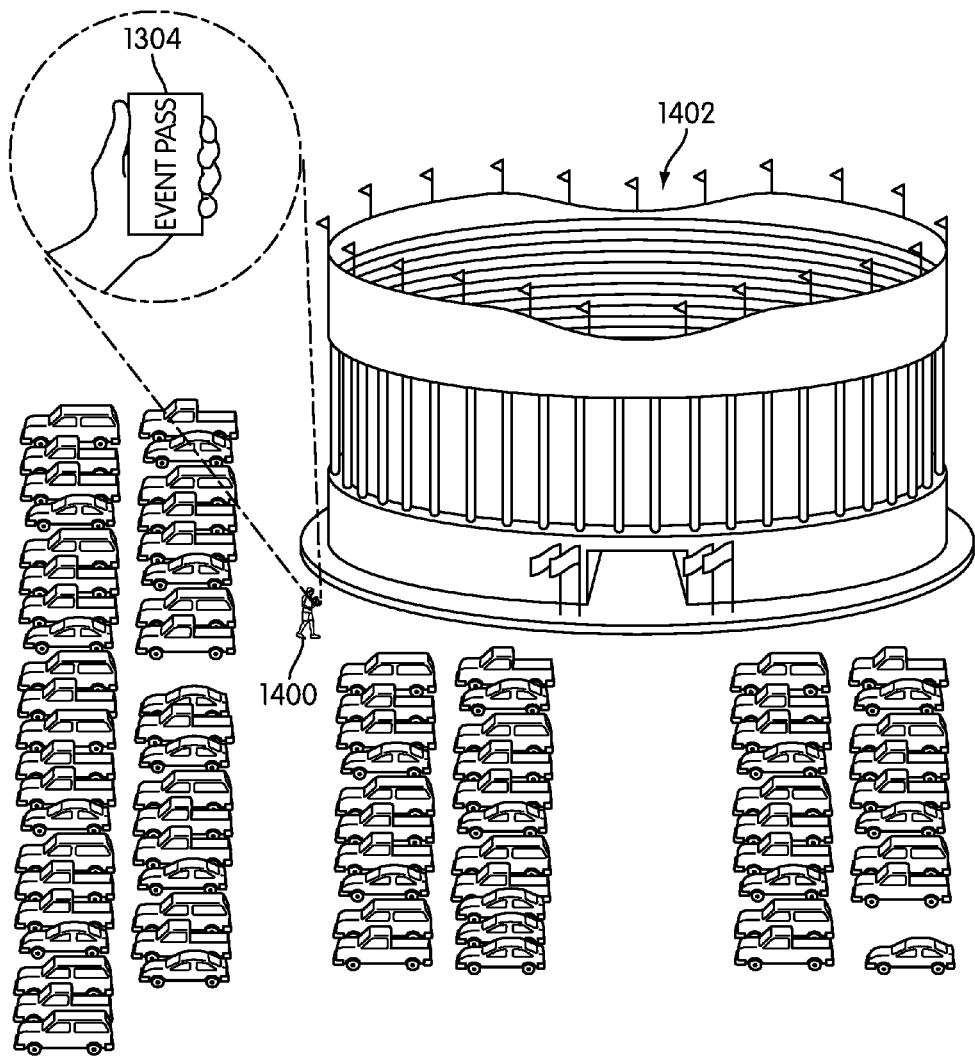
FIG. 17 is a schematic view of an embodiment of a user arriving at a special event.
Figure 18:
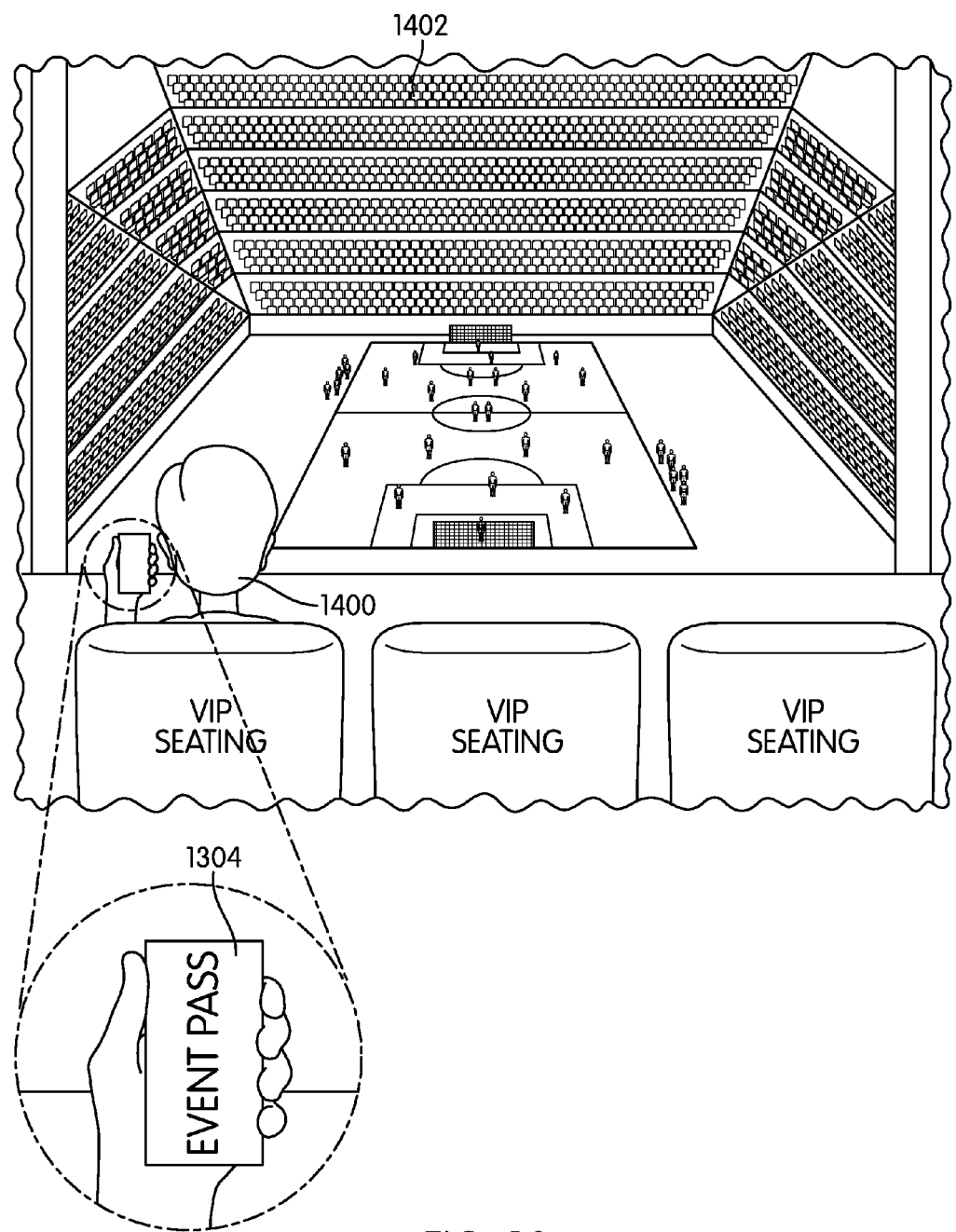
FIG. 18 is a schematic view of an embodiment of a user watching a special event.

Referring now to FIGS. 17 and 18, event pass 1304 may provide user 1400 access to a special event. In some cases, the special event could be a soccer game hosted at stadium 1402. For example, event pass 1304 could provide access instead of a standard ticket. In addition, in some cases, event pass 1304 could allow a user to sit in special seating areas, as seen in FIG. 18, where user 1400 is sitting in a VIP seating section of stadium 1402. In some cases, event pass 1304 could allow a user access to limited access areas where athletes prepare for games. In other words, in some cases, event pass 1304 could function as a backstage pass.

Figure 19:
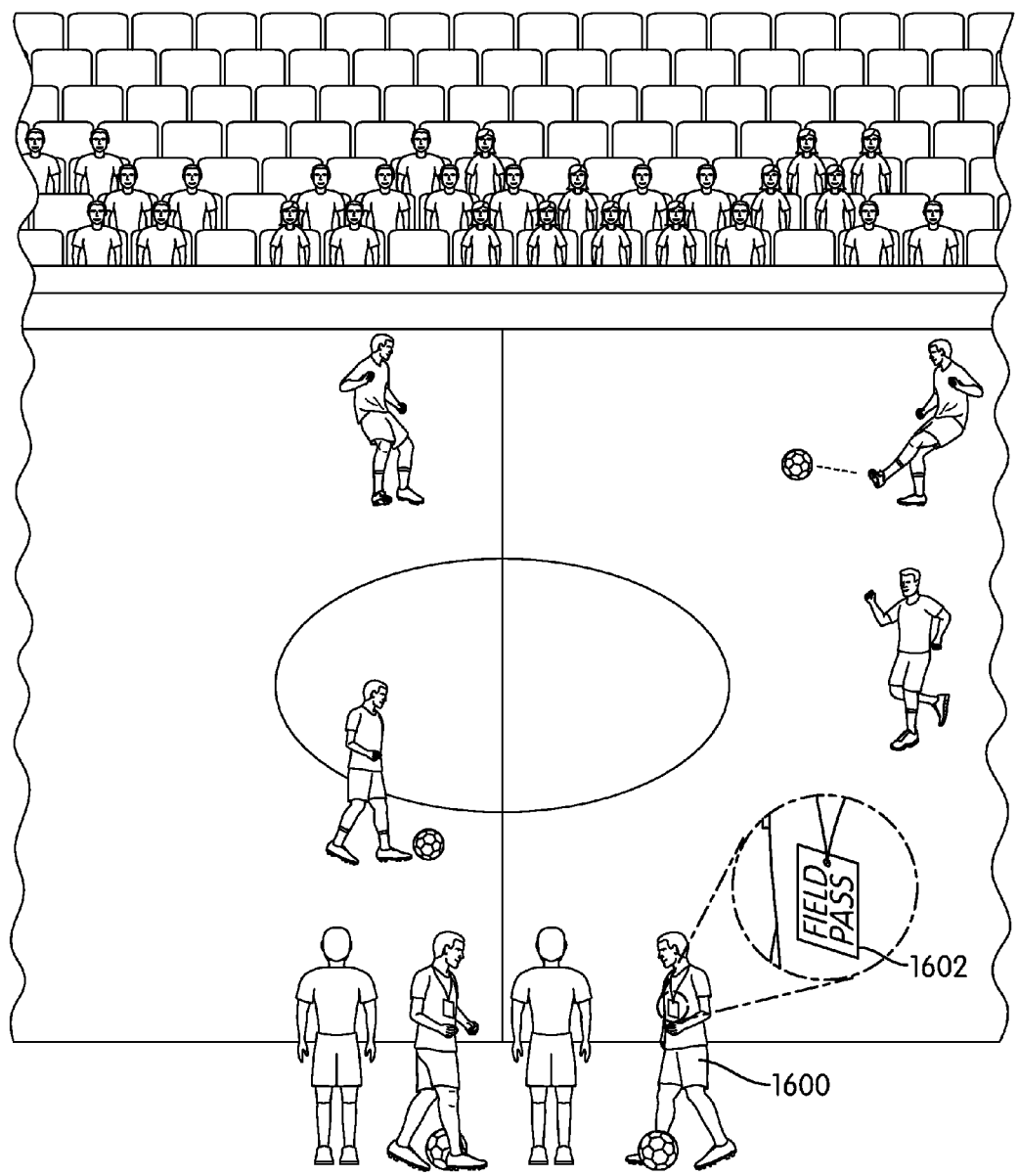
FIG. 19 is a schematic view of an embodiment of a user taking part in a training event.

FIG. 19 illustrates an embodiment of a special training event. Referring to FIG. 19, user 1600 may obtain field pass 1602 by purchasing a pair of footwear with an associated customized training program. In some cases, field pass 1602 could be downloaded from a website by entering an access code provided with the pair of footwear, where the access code also allows a user to unlock online training content.

In some embodiments, field pass 1602 may allow a user to take part in one or more training events. The training events could be led by one or more soccer pros or well known soccer players. With this arrangement, user 1600 can be trained by professional athletes as an extension of the customized training program that may also be provided in the form of training videos as well as other training material. This allows user 1600 to receive real-time feedback regarding progress in improving in a particular skill area.

A training system can include provisions for varying the access to different customized training programs. In some cases, a set of articles of footwear may be divided into different subsets. Each subset may be associated with some, all, or no access to various different customized training programs.

Figure 20:
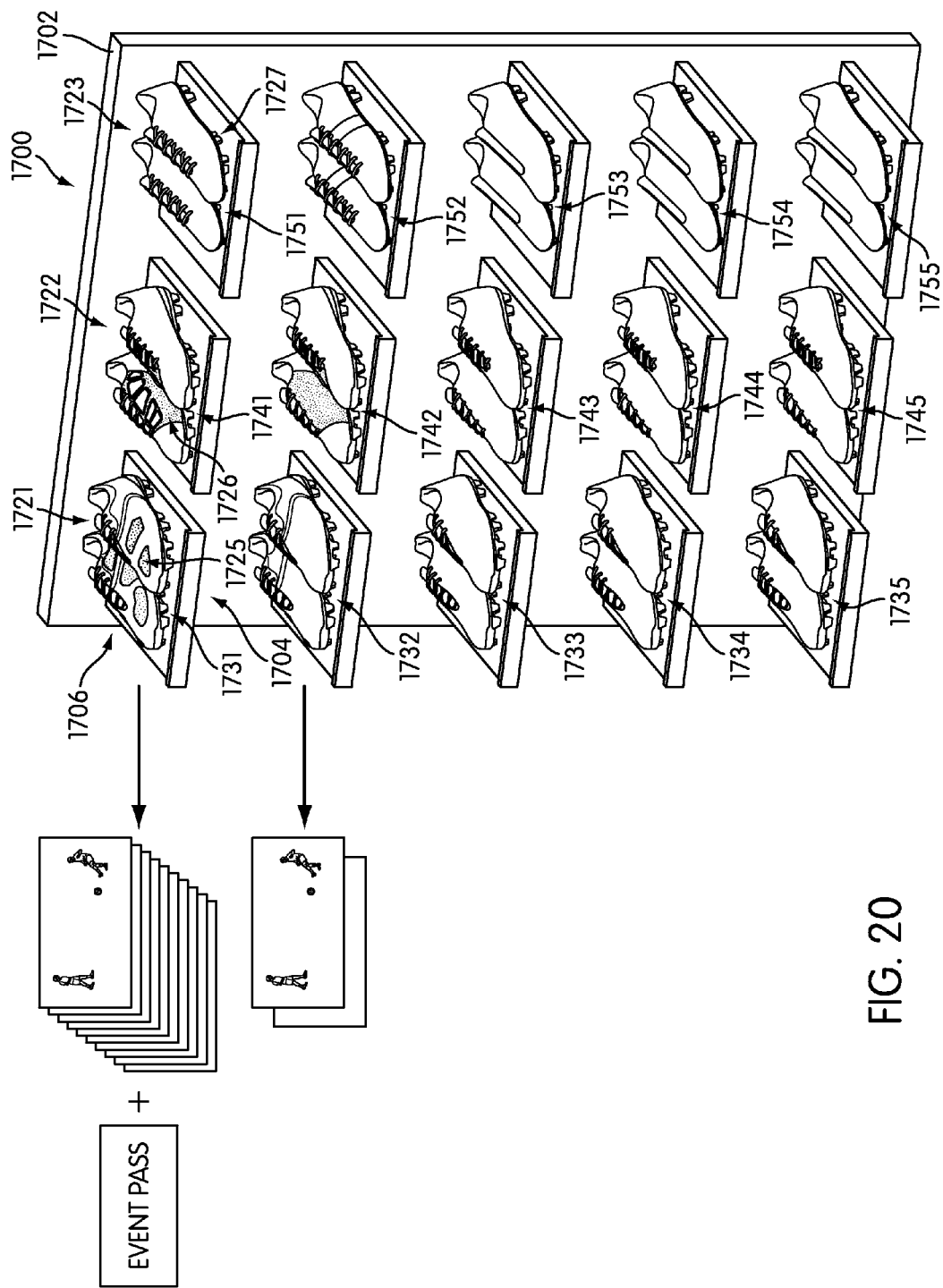
FIG. 20 is a schematic view of an embodiment of an association between different articles of footwear and different levels of customized training programs.

FIG. 20 illustrates another embodiment of retail setting 1700 where articles of footwear may be sold. Retail setting 1700 could be any type of retail location where footwear is sold including a footwear store, a department store, a kiosk as well as any other type of retail location. Although the current embodiment illustrates a physical retail setting for selling articles of footwear, in other embodiments, articles of footwear could be sold online.

Referring to FIG. 20, retail setting 1700 may be configured with footwear display wall 1702. In this embodiment, wall 1702 further includes shelves 1704 for displaying different articles of footwear. Plurality of articles of footwear 1706 may be disposed on shelves 1704. In one embodiment, plurality of articles of footwear 1706 may be various kinds of soccer shoes. In other embodiments, plurality of articles of footwear 1706 may be associated with any other kinds of shoes.

Articles of footwear 1706 may be organized into various sets of articles footwear. For example, articles 1706 may comprise first set of footwear 1721, second set of footwear 1722 and third set of footwear 1723. In some cases, each set of footwear may be associated with a particular athletic skill. For example, in the exemplary embodiment, first set of footwear 1721 may include articles of footwear associated with improving control over a ball. Second set of footwear 1722 may include articles of footwear associated with improving kicking accuracy. Also, third set of footwear 1723 may include articles of footwear associated with improving speed.

Each set of footwear may be divided into two or more subsets. In this embodiment, first set of footwear 1721 includes first subset 1731, second subset 1732, third subset 1733, fourth subset 1734 and fifth subset 1735, which each include different kinds of footwear that help improve ball control. Likewise, second set of footwear 1722 includes first subset 1741, second subset 1742, third subset 1743, fourth subset 1744 and fifth subset 1745, which each include different kinds of footwear that help improve accuracy. Furthermore, third set of footwear 1723 includes first subset 1751, second subset 1752, third subset 1753, fourth subset 1754 and fifth subset 1755, which each include different kinds of footwear that help improve speed.

In one embodiment, first subset 1731 of first set of footwear 1721 may include articles of footwear with shape correcting pads 1725 that facilitate ball control during passing. Likewise, first subset 1741 of second set of footwear 1722 may include articles of footwear with ball control portions 1726 that facilitate increased accuracy. Furthermore, first subset 1751 of third set of footwear 1723 may includes articles of footwear with extendable traction elements 1727 that facilitate increased speed.

In some embodiments, articles within different subsets of the same set of footwear could be substantially similar. In other embodiments, articles within different subsets of the same set of footwear could be substantially different. Moreover, in some cases, some articles could share some common physical characteristics and not others. In one embodiment, first subset 1731 of first set of footwear 1721 may be the only articles within first set of footwear 1721 that include shape correcting pads 1725. In another embodiment, however, articles in other subsets of first set of footwear 1721 could include shape correcting pads 1725. Likewise, in one embodiment, first subset 1741 of second set of footwear 1722 may be the only articles within second set of footwear 1722 that include ball control portions 1726. In other embodiments, however, articles in other subsets of second set of footwear 1722 could include ball control portions 1726. Also, in one embodiment, first subset 1751 of third set of footwear 1723 may be the only articles within third set of footwear 1723 that include extendable traction elements 1727. In other embodiments, however, articles in other subsets of third set of footwear 1723 could include extendable traction elements 1727.

In different embodiments, different subsets of articles within a set of footwear can be associated with different levels of customized training programs. For example, in one embodiment, first subset 1731 of first set of footwear 1721 may be associated with a customized training program that includes access to a full set of customized training materials including videos, special event passes as well as other features. In particular, in some cases, upon purchasing articles of footwear from first subset 1731 from first set of footwear 1721, a user may be provided with complete access to all customized training materials that are configured for improving ball control skills including passing, trapping and other associated ball control skills. In addition, first subset 1741 of second set of footwear 1722 may be associated with a complete customized training program that includes access to a full set of customized training materials including videos, special event passes as well as other features. In particular, in some cases, upon purchasing articles of footwear from first subset 1741 from second set of footwear 1722, a user may be provided with complete access to all customized training materials that are configured for improving accuracy skills including shooting a ball accurately. In addition, first subset 1751 of third set of footwear 1723 may be associated with a complete customized training program that includes access to a full set of customized training materials including training videos, special event passes as well as other features. In particular, in some cases, upon purchasing articles of footwear from first subset 1751 from third set of footwear 1723, a user may be provided with complete access to all customized training materials that are configured for improving forward and rearward speed as well as lateral speed. In other words, a user purchasing articles of footwear from any of the first subsets of any set of footwear may be provided with a full set of customized training materials that are custom tailored for each particular set of footwear.

In some embodiments, second subset 1732 of first set of footwear 1721, second subset 1742 of second set of footwear 1722 and second subset 1752 of third set of footwear 1723 may all be associated with partial access to various customized training programs. In some cases, partial access may provide a user with access to a partial set of customized training materials. In other words, partial access may provide a user with access to some, but not all, training materials such as training videos. In some cases, partial access may provide a user with access to some kinds of events, but not other kinds of events. In other cases, partial access may not provide a user with access to any kinds of events.

For example, in some cases, upon purchasing articles of footwear from second subset 1732 from first set of footwear 1721, a user may be provided with access to two training videos that are associated with a larger set of training videos for ball control training. In addition, in an exemplary embodiment, a user may not be provided with access to any special events. Additionally, a user purchasing articles of footwear from second subset 1742 of second set of footwear 1722 may be provided with access to two training videos that are associated with a larger set of training videos for accuracy training. In addition, a user may not be provided with access to any special events. A user purchasing articles of footwear from second subset 1752 of third set of footwear 1723 may be provided with access to two training videos that are associated with a larger set of training videos for speed training. In addition, a user may not be provided with access to any special events.

In other embodiments, additional sets of footwear could be provided, where each additional set is associated with a different kind of athletic skill. Moreover, each set of footwear can include two or more subsets of footwear, where each subset is associated with a different level of access to customized training programs. The different levels of access may range from full access to no access and can include partial or intermediate access for some subsets of footwear. This allows a user the ability to choose between different levels of training according to his or her needs. Some users may desire a comprehensive training program to help them in training to improve an athletic skill. In such cases, the user may purchase articles associated with full access to a customized training program. Other users may not want to use a customized training program and could purchase articles that exclude the customized training program. Still other users could purchase articles associated with partial or limited access to a customized training program to gain some training assistance.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A training system, comprising:
a first article of footwear having a first physical characteristic, the first physical characteristic being configured to perform a first athletic skill related to a first method of contacting a ball;
a second article of footwear having a second physical characteristic, the second physical characteristic being configured to perform a second athletic skill related to a second method of contacting a ball, the second physical characteristic of the second article of footwear being different than the first physical characteristic of the first article of footwear;
a first customized training program including instructions for training a user to improve the first athletic skill; and
a second customized training program including instructions for training a user to improve the second athletic skill;
wherein the first athletic skill is different than the second athletic skill; and
wherein the first method of contacting a ball is different than the second method of contacting a ball.

2. The training system according to claim 1, wherein the customized training program is provided as a set of training videos.

3. The training system according to claim 1, wherein the customized training program is a multi-session training program with different training materials for each session.

4. The training system according to claim 1, wherein the first article of footwear is sold with the first customized training program and wherein the second article of footwear is sold with the second customized training program.

5. The training system according to claim 1, wherein the first article of footwear is provided in a container and wherein the container includes information for accessing the first customized training program.

6. The training system according to claim 1, wherein the first customized training program and the second customized training program are provided as a single video with a first segment associated with the first customized training program and a second segment associated with the second customized training program.

7. The training system according to claim 1, wherein the first customized training program and the second customized training program are accessible online.

8. The training system according to claim 1, wherein the second physical characteristic includes an externally exposed component of the upper.

9. The training system according to claim 8, wherein the second physical characteristic includes an upper including a ball control portion, the ball control portion comprising a plurality of protrusions that are configured to bend, each protrusion of the plurality of protrusions including a major axis, a minor axis, and a normal axis, the normal axis being approximately perpendicular to the major axis and the minor axis;
 each protrusion of the plurality of protrusions further including a gripping portion that extends in a direction along the major axis and in a direction along the normal axis;
 wherein the plurality of protrusions are disposed in an arc-like configuration.

10. The training system according to claim 9, wherein the gripping portion is planar;
 wherein the plurality of protrusions are disposed in an arc-like configuration along an arc;
 wherein adjacent protrusions along the arc are arranged with the major axes of the adjacent protrusions in substantial alignment with each other; and
 wherein non-adjacent protrusions along the arc are arranged with the major axes of the non-adjacent protrusions in substantial non-alignment with each other.

11. The training system according to claim 1, further including a third article of footwear having a third physical characteristic associated with a third athletic skill.

12. The training system according to claim 11, wherein the third athletic skill is speed.

13. The training system according to claim 12, wherein the third article of footwear includes an outsole base and an elastic member having a first end fixed relative to the outsole base and a second end projecting away from the outsole base, the elastic member forming a portion of a traction element positioned for ground penetration when the article is used by a wearer of the third article of footwear; and
 an actuating member located within the elastic member and positioned to transfer force from a foot of the wearer to the elastic member second end.

14. The training system according to claim 13, wherein the actuating member includes a flange and the third article of footwear further comprises a stop collar fixed relative to the outsole base and having a rim, wherein:
 the actuating member flange moves away from the stop collar rim in response to downward force on the actuating member that elongates the elastic member, and
 the stop collar rim is positioned to contact the actuating member flange and limit movement of the actuating member toward an interior region within an upper of the third article of footwear when downward force on the actuating member is reduced.

15. An integrated training system, comprising:
 a first article of footwear including a first physical characteristic associated with a first athletic skill involving contacting a ball with the article of footwear;
 wherein the first physical characteristic includes a shape correcting member including an inner surface associated with a portion of a foot and an outer surface disposed opposite of the inner surface;
 the inner surface of the shape correcting member being pre-shaped to fit to the contours of the portion of the foot;
 wherein the outer surface of the shape correcting member is a substantially non-protruding surface;
 a second article of footwear including a second physical characteristic associated with a second athletic skill involving contacting a ball with the article of footwear;
 the second physical characteristic including an upper including a ball control portion, the ball control portion comprising a plurality of protrusions that are configured to bend, each protrusion of the plurality of protrusions including a major axis, a minor axis, and a normal axis, the normal axis being approximately perpendicular to the major axis and the minor axis;
 each protrusion of the plurality of protrusions further including a gripping portion that extends in a direction along the major axis and in a direction along the normal axis;
 wherein the plurality of protrusions are disposed in an arc-like configuration;
 a first customized training program;
 wherein the first customized training program is configured to train a user to improve the first athletic skill; and
 a second customized training program;
 wherein the second customized training program is configured to train a user to improve the second athletic skill.

16. The integrated training system according to claim 15, wherein the first athletic skill is controlling a ball.

17. The integrated training system according to claim 16, wherein the article of footwear has a medial side and a lateral side, wherein a lateral direction extends between the medial and lateral side;
 wherein the inner surface includes a plurality of laterally spaced, pre-formed cavities, configured to fit to the contours of the to portion of the foot; and
 wherein the outer surface is a substantially non-protruding surface having an approximately constant curvature.

18. The integrated training system according to claim 15, wherein the second athletic skill is kicking accuracy.

19. The integrated training system according to claim 18, wherein the gripping portion is planar;
 wherein the plurality of protrusions are disposed in an arc-like configuration along an arc;
 wherein adjacent protrusions along the arc are arranged with the major axes of the adjacent protrusions in substantial alignment with each other; and
 wherein non-adjacent protrusions along the arc are arranged with the major axes of the non-adjacent protrusions in substantial non-alignment with each other.

20. The integrated training system according to claim 15, further including a third article of footwear having a third physical characteristic associated with a third athletic skill wherein the third athletic skill is speed;
 the third article of footwear including an outsole base and an elastic member having a first end fixed relative to the outsole base and a second end projecting away from the outsole base, the elastic member forming a portion of a traction element positioned for ground penetration when the article is used by a wearer of the third article of footwear; and
 an actuating member located within the elastic member and positioned to transfer force from a foot of the wearer to the elastic member second end.

21. The integrated training system according to claim 20, wherein the actuating member includes a flange and the third article of footwear further comprises a stop collar fixed relative to the outsole base and having a rim;

wherein the actuating member flange moves away from the stop collar rim in response to downward force on the actuating member that elongates the elastic member; and wherein the stop collar rim is positioned to contact the actuating member flange and limit movement of the actuating member toward an interior region within an upper of the third article of footwear when downward force on the actuating member is reduced.

22. A training system, comprising:
a set of articles of footwear associated with an athletic skill, the set of articles of footwear including a first subset of footwear and a second subset of footwear that is different from the first subset of footwear;
a first set of customized training materials from a customized training program, the customized training program being configured to train a user to improve the athletic skill; and
wherein the first subset of footwear includes the first set of customized training materials and the second subset of footwear excludes the first set of customized training materials;
wherein the set of articles of footwear includes a third subset of footwear that is different from both the first subset of footwear and the second subset of footwear and wherein the third subset of footwear includes a second, partial set of customized training materials and wherein the partial set of customized training materials includes less training materials than the first set of customized training materials.

23. The training system according to claim 22, wherein the set of articles of footwear includes scales of customized training materials.

24. The training system according to claim 23, wherein the customized training materials include training videos.

25. The training system according to claim 24, wherein the first set of customized training materials includes more training videos than the second, partial set of customized training materials.

26. The training system according to claim 22, wherein the first set of customized training materials includes a special event pass.

27. The training system according to claim 22, wherein the first subset of footwear is sold with the set of customized training materials.

28. The training system according to claim 22, wherein the customized training program includes at least one skill test.

29. The training system according to claim 28, wherein the skill test is a speed test for testing the speed of a user.

30. The training system according to claim 28, wherein the skill test is an accuracy test for testing the kicking accuracy of a user.

31. The training system according to claim 28, wherein the skill test is a control test for testing the ability of a user to control a ball.

32. A training system, comprising:
a set of articles of footwear associated with an athletic skill, the set of articles of footwear including a first subset of footwear and a second subset of footwear that is different from the first subset of footwear; and
scales of customized training materials including a first set of customized training materials from a first customized training program, the first customized training program being configured to train a user to improve the athletic skill, and a second set of customized training materials from a customized training program, the customized training program being configured to train a user to improve the athletic skill;
wherein the first subset of footwear includes the first set of customized training materials and the second customized set of training materials includes same customized training materials included in the first set of customized training materials as well as additional customized training materials.

33. The training system according to claim 1, wherein the first physical characteristic includes a shape correcting member including an inner surface associated with a portion of a foot and an outer surface disposed opposite of the inner surface;
the inner surface of the shape correcting member being pre-shaped to fit to the contours of the portion of the foot;
wherein the outer surface of the shape correcting member is a substantially non-protruding surface.

34. The training system according to claim 33, wherein the first article of footwear has a medial side and a lateral side, wherein a lateral direction extends between the medial and lateral side;
wherein the inner surface includes a plurality of laterally spaced, pre-formed cavities, configured to fit to the contours of the top portion of the foot; and
wherein the outer surface is a substantially non-protruding surface having an approximately constant curvature.

* * * * *